(12) United States Patent
Felch et al.

(10) Patent No.: US 12,638,553 B2
(45) Date of Patent: May 26, 2026

(54) RADAR APPLICATION PROGRAMMING INTERFACE

(71) Applicant: Google LLC, Mountain View, CA (US)

(72) Inventors: Andrew C. Felch, Palo Alto, CA (US); Shang Shi, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 302 days.

(21) Appl. No.: 18/556,816

(22) PCT Filed: May 24, 2022

(86) PCT No.: PCT/US2022/072525
§ 371 (c)(1),
(2) Date: Oct. 23, 2023

(87) PCT Pub. No.: WO2022/251825
PCT Pub. Date: Dec. 1, 2022

(65) Prior Publication Data
US 2024/0280669 A1 Aug. 22, 2024

Related U.S. Application Data

(60) Provisional application No. 63/192,500, filed on May 24, 2021.

(51) Int. Cl.
*G01S 7/41* (2006.01)
*G01S 13/62* (2006.01)
(Continued)

(52) U.S. Cl.
CPC .............. *G01S 7/417* (2013.01); *G01S 13/62* (2013.01); *G01S 13/88* (2013.01); *G06F 3/017* (2013.01)

(58) Field of Classification Search
CPC .......... G01S 7/417; G01S 13/62; G01S 13/88; G06F 3/017; G06V 10/94; G06V 40/28
See application file for complete search history.

(56) References Cited

U.S. PATENT DOCUMENTS

| | | | |
|---|---|---|---|
| 9,449,492 B2 * | 9/2016 | Dixon | G06F 3/017 |
| 9,921,657 B2 * | 3/2018 | Sprenger | G06F 3/017 |

(Continued)

FOREIGN PATENT DOCUMENTS

| | | |
|---|---|---|
| CN | 108153410 | 6/2018 |
| DE | 202017105261 | 3/2018 |

(Continued)

OTHER PUBLICATIONS

"International Search Report and Written Opinion", Application No. PCT/US2022/072525, Oct. 4, 2022, 11 pages.

(Continued)

*Primary Examiner* — William Kelleher
*Assistant Examiner* — Ismaaeel A. Siddiquee
(74) *Attorney, Agent, or Firm* — Colby Nipper PLLC

(57) ABSTRACT

Techniques and apparatuses are described that implement a radar application programming interface. The radar application programming interface provides a standardized language for external entities, such as an application a smart device, to communicate with a radar system without having to understand the design and operational complexities employed by the radar system. With the radar application programming interface, a third-party can readily interact with the radar system and customize use the radar system for a variety of different applications. In this way, the radar application programming interface can enable other entities to expand the utilization of the radar system, thereby providing additional features to enhance user experience.

20 Claims, 17 Drawing Sheets

(51) Int. Cl.
　　*G01S 13/88*　　　(2006.01)
　　*G06F 3/01*　　　(2006.01)

(56)　　　　References Cited

U.S. PATENT DOCUMENTS

| | | | |
|---|---|---|---|
| 10,503,883 B1 * | 12/2019 | Gillian | G01S 7/415 |
| 2011/0181509 A1 * | 7/2011 | Rautiainen | G01S 13/56 |
| | | | 345/158 |
| 2012/0280900 A1 | 11/2012 | Wang et al. | |
| 2013/0027309 A1 * | 1/2013 | Li | G06F 3/0486 |
| | | | 345/157 |
| 2015/0277569 A1 | 10/2015 | Sprenger et al. | |
| 2018/0157330 A1 | 6/2018 | Gu et al. | |
| 2018/0329050 A1 | 11/2018 | Amihood et al. | |
| 2019/0033981 A1 * | 1/2019 | Poupyrev | G01S 7/415 |
| 2019/0087198 A1 * | 3/2019 | Frascati | H04N 9/79 |
| 2020/0064445 A1 * | 2/2020 | Amihood | G06F 1/3275 |
| 2021/0103031 A1 * | 4/2021 | Cohen | G01S 7/417 |
| 2023/0000396 A1 * | 1/2023 | Coffey | A61B 5/1117 |

FOREIGN PATENT DOCUMENTS

| | | | |
|---|---|---|---|
| JP | 2014501415 A | 1/2014 | |
| JP | 2015195020 A | 11/2015 | |
| JP | 2017517062 A | 6/2017 | |
| JP | 2017524170 A | 8/2017 | |
| JP | 2021507326 A | 2/2021 | |
| KR | 20190091132 A | 8/2019 | |
| WO | 2019241877 A1 | 12/2019 | |
| WO | 2022251825 | 12/2022 | |

OTHER PUBLICATIONS

"Foreign Office Action", JP Application No. 2023-568039, Jan. 7, 2025, 5 pages.
"International Preliminary Report on Patentability", Application No. PCT/US2022/072525, Nov. 21, 2023, 11 pages.
"Foreign Office Action", KR Application No. 10-2023-7037752, Dec. 16, 2025, 18 pages.

* cited by examiner

Smart Device
104

Computer Processor
202

Computer-Readable Medium
204

Application
206

Network Interface
208

Radar API
210

Radar System
102

Communication Interface
212

Antenna Array
214

Transceiver
216

System Processor
218

System Medium
220

1100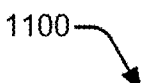

Accept, via a first layer of multiple layers of a radar application programming interface of the smart device, a first request from an application of a smart device, the first request comprising a pattern recognition sequence that specifies a sequence of states associated with a gesture, the multiple layers of the radar application programming interface associated with different operational levels of the radar system
1102

Accept, via a second layer of the multiple layers of the radar application programming interface, a second request from the application of the smart device, the second request comprising a detection range of the radar system for detecting the gesture
1104

Modify a hardware configuration of the radar system based on the detection range
1106

Transmit and receive a radar signal using the hardware configuration, at least a portion of the radar signals reflecting off an object that performs the gesture
1108

Recognize the gesture based on the pattern recognition sequence and the received radar signal
1110

Responsive to the recognizing, sending, via the radar application programming interface, a response to the application indicating occurrence of the gesture
1112

FIG. 11

RADAR APPLICATION PROGRAMMING INTERFACE

RELATED APPLICATION(S)

This application is a national stage entry of International Application No. PCT/US2022/072525, filed May 24, 2022, which claims the benefit of U.S. Provisional Application No. 63/192,500, filed May 24, 2021, the disclosures of which are incorporated herein by reference in their entirety.

BACKGROUND

Radars are useful devices that can detect objects. Relative to other types of sensors, like a camera, a radar can provide improved performance in many different environmental conditions, such as low lighting and fog, or with moving or overlapping objects. Radar can also detect objects through one or more occlusions, such as a purse or a pocket.

A radar can be a complex piece of technology with particular tradeoff considerations made to realize a target performance. Example tradeoff considerations include detection range; range, Doppler, and angular resolution; range and Doppler ambiguities; sensitivity; false-alarm rate; reaction time; size; power consumption; and cost. Due to the complex design and operational considerations, radars often customized for particular applications. For example, some radars provide navigational aid, others may map an environment, still others may assist a user interacting with an electronic device.

While radar has many advantages, it can be viewed as a black box by other external entities, which may be unaware of the complexities that enable the radar to achieve the target performance. As a result, it can be challenging for applications in an electronic device to take advantage of the features offered by radar. Consequently, radar can be limited to supporting a few specific applications.

SUMMARY

Techniques and apparatuses are described that implement a radar application programming interface (API). The radar application programming interface provides a standardized language for external entities, such as an application of a smart device, to communicate with a radar system without having to understand the design and operational complexities employed by the radar system. With the radar application programming interface, a third-party can readily interact with the radar system and customize use of the radar system for a variety of different applications. In this way, the radar application programming interface can enable other entities to expand the utilization of the radar system, thereby providing additional features to enhance user experience.

Aspects described below include a method performed by a radar system of a smart device. The method includes accepting, via a first layer of multiple layers of a radar application programming interface of the smart device, a first request from an application of the smart device. The first request includes a pattern recognition sequence that specifies a sequence of states associated with a gesture. The multiple layers of the radar application programming interface are associated with different operational levels of the radar system. The method also includes accepting, via a second layer of the multiple layers of the radar application programming interface, a second request from the application of the smart device. The second request includes a detection range of the radar system for detecting the gesture. The method additionally includes modifying a hardware configuration of the radar system based on the detection range. The method further includes transmitting and receiving a radar signal using the hardware configuration. At least a portion of the radar signal reflects off an object that performs the gesture. The method also includes recognizing the gesture based on the pattern recognition sequence and the received radar signal. Responsive to the recognizing, the method includes sending, via the radar application programming interface, a response to the application indicating occurrence of the gesture.

Aspects described below also include an apparatus comprising a radar system configured to perform any of the described methods.

Aspects described below include a computer-readable storage medium comprising computer-executable instructions that, responsive to execution by a processor, cause a radar system to perform any one of the described methods.

Aspects described below also include a system with means for providing a radar application programming interface.

BRIEF DESCRIPTION OF DRAWINGS

Apparatuses for and techniques implementing a radar application programming interface are described with reference to the following drawings. The same numbers are used throughout the drawings to reference like features and components:

FIG. 1 illustrates example environments in which a smart-device-based radar system can be implemented;

FIG. 2-1 illustrates an example implementation of a radar system as part of a smart device;

FIG. 2-2 illustrates an example system medium of a radar system;

FIG. 3-1 illustrates an example radar application programming interface;

FIG. 3-2 illustrates example relationships between multiple layers of a radar application programming interface and operational levels of a radar system;

FIG. 5-1 illustrates an example pattern recognition sequence associated with a pump gesture;

FIG. 5-2 illustrates example object behavior associated with a pump gesture;

FIG. 6-1 illustrates an example pattern recognition sequence associated with a swipe gesture;

FIG. 6-2 illustrates example object behavior associated with a swipe gesture;

FIG. 7-1 illustrates an example pattern recognition sequence associated with a reach gesture;

FIG. 7-2 illustrates example object behavior associated with a reach gesture;

FIG. 11 illustrates an example method performed by a radar system using a radar application programming interface.

DETAILED DESCRIPTION

Radars are useful devices that can detect objects. Relative to other types of sensors, like a camera, a radar can provide improved performance in many different environmental conditions, such as low lighting and fog, or with moving or overlapping objects. Radar can also detect objects through one or more occlusions, such as a purse or a pocket.

A radar can be a complex piece of technology with particular tradeoff considerations made to realize a target performance. Example tradeoff considerations include detection range; range, Doppler, and angular resolution; range and Doppler ambiguities; sensitivity; false-alarm rate; reaction time; size; power consumption; and cost. Due to the complex design and operational considerations, radars are often customized for particular applications. For example, some radars provide navigational aid, others may map an environment, still others may assist a user interacting with an electronic device.

While radar has many advantages, it can be viewed as a black box by other external entities, which may be unaware of the complexities that enable the radar to achieve the target performance. As a result, it can be challenging for applications in an electronic device to take advantage of the features offered by radar. Consequently, radar can be limited to supporting a few specific applications.

To address this challenge, techniques are described that implement a radar application programming interface (API). The radar application programming interface provides a standardized language for external entities, such as an application of a smart device, to communicate with a radar system without having to understand the design and operational complexities employed by the radar system. With the radar application programming interface, a third-party can readily interact with the radar system and customize use of the radar system for a variety of different applications. In this way, the radar application programming interface can enable other entities to expand the utilization of the radar system, thereby providing additional features to enhance user experience.

Operating Environment

Figures 1, 2:
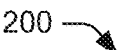
Figure 2:
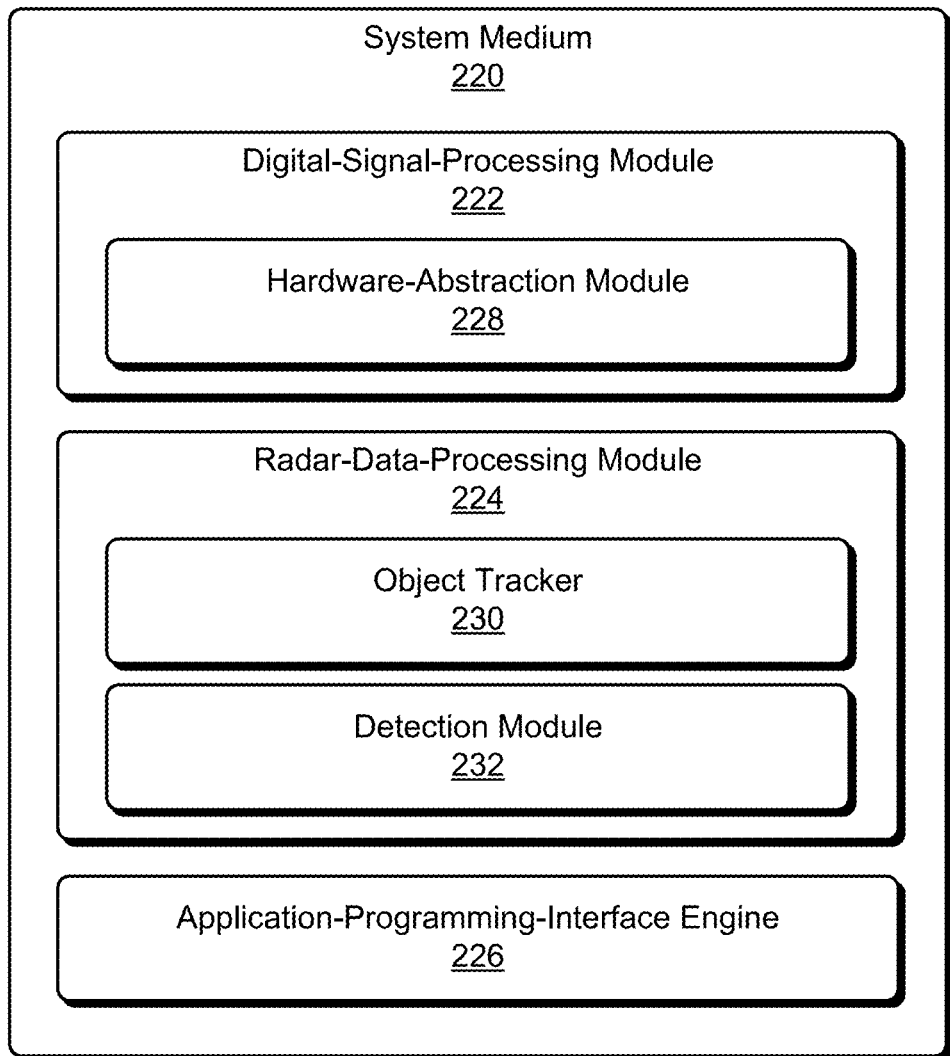

FIG. 1 is an illustration of example environments 100-1 to 100-6 in which techniques using, and an apparatus including, a radar system may be embodied. In the depicted environments 100-1 to 100-6, a smart device 104 includes a radar system 102 capable of interfacing with a variety of different applications of the smart device 104 via a radar application programming interface (of FIG. 2-1). The smart device 104 is shown to be a smartphone in environments 100-1 to 100-5 and a smart vehicle in the environment 100-6.

In the environments 100-1 to 100-4, a user performs different types of gestures, which are detected by the radar system 102. In some cases, the user performs a gesture using an appendage or body part. Alternatively, the user can also perform a gesture using a stylus, a hand-held object, a ring, or any type of material that can reflect radar signals. Through the use of the radar application programming interface, operations of the radar system 102 can be dynamically tailored based on the type of gestures the radar system 102 is requested to recognize.

In environment 100-1, the user makes a scrolling gesture by moving a hand above the smart device 104 along a horizontal dimension (e.g., from a left side of the smart device 104 to a right side of the smart device 104). In the environment 100-2, the user makes a reaching gesture, which decreases a distance between the smart device 104 and the user's hand. The users in environment 100-3 make hand gestures to play a game on the smart device 104. In one instance, a user makes a pushing gesture by moving a hand above the smart device 104 along a vertical dimension (e.g., from a bottom side of the smart device 104 to a top side of the smart device 104). Using information passed along by the radar application programming interface, the radar system 102 can recognize the gestures performed by the user. In the environment 100-4, the smart device 104 is stored within a purse, and the radar system 102 provides occluded-gesture recognition by detecting gestures that are occluded by the purse.

The radar system 102 can also recognize other types of gestures or motions not shown in FIG. 1. Example types of gestures include a knob-turning gesture in which a user curls their fingers to grip an imaginary doorknob and rotate their fingers and hand in a clockwise or counter-clockwise fashion to mimic an action of turning the imaginary doorknob. Another example type of gesture includes a spindle-twisting gesture, which a user performs by rubbing a thumb and at least one other finger together. The gestures can be two-dimensional, such as those used with touch-sensitive displays (e.g., a two-finger pinch, a two-finger spread, or a tap). The gestures can also be three-dimensional, such as many sign-language gestures, e.g., those of American Sign Language (ASL) and other sign languages worldwide. Upon detecting each of these gestures, the smart device 104 can perform an action, such as display new content, move a cursor, activate one or more sensors, open an application, and so forth. In this way, the radar system 102 provides touch-free control of the smart device 104.

In the environment 100-5, the radar system 102 generates a three-dimensional map of a surrounding environment for contextual awareness. The radar system 102 also detects and tracks multiple users to enable both users to interact with the smart device 104. The radar system 102 can also perform vital-sign detection. In the environment 100-6, the radar system 102 monitors vital signs of a user that drives a vehicle. Example vital signs include a heart rate and a respiration rate. If the radar system 102 determines that the driver is falling asleep, for instance, the radar system 102 can cause the smart device 104 to alert the user. Alternatively, if the radar system 102 detects a life threatening emergency, such as a heart attack, the radar system 102 can cause the smart device 104 to alert a medical professional or emergency services. In some implementations, the radar system 102 in the environment 100-6 can support collision avoidance for autonomous driving and/or navigational assistance. In general, the radar system can support a variety of different applications including touchless gesture controls, health monitoring (e.g., sleep tracking or vital sign monitoring), fitness tracking, proximity detection, spatial mapping, and human activity recognition (e.g., fall detection, attention, sitting, or standing).

Some implementations of the radar system 102 are particularly advantageous as applied in the context of smart devices 104, for which there is a convergence of issues. This can include a need for limitations in a spacing and layout of the radar system 102 and low power. Exemplary overall lateral dimensions of the smart device 104 can be, for example, approximately eight centimeters by approximately fifteen centimeters. Exemplary footprints of the radar system 102 can be even more limited, such as approximately four millimeters by six millimeters with antennas included. Exemplary power consumption of the radar system 102 may be on the order of a few milliwatts to tens of milliwatts (e.g., between approximately two milliwatts and twenty milliwatts). The requirement of such a limited footprint and power consumption for the radar system 102 enables the smart device 104 to include other desirable features in a space-limited package (e.g., a camera sensor, a fingerprint sensor, a display, and so forth). The smart device 104 and the radar system 102 are further described with respect to FIG. 2-1.

FIG. 2-1 illustrates the radar system 102 as part of the smart device 104. The smart device 104 is illustrated with various non-limiting example devices including a desktop computer 104-1, a tablet 104-2, a laptop 104 3, a television 104-4, a computing watch 104-5, computing glasses 104-6, a gaming system 104-7, a microwave 104-8, and a vehicle 104-9. Other devices may also be used, such as a home service device, a smart speaker, a smart thermostat, a security camera, a baby monitor, a Wi-Fi™ router, a drone, a trackpad, a drawing pad, a netbook, an e-reader, a home automation and control system, a wall display, and another home appliance. Note that the smart device 104 can be wearable, non-wearable but mobile, or relatively immobile (e.g., desktops and appliances). The radar system 102 can be used as a stand-alone radar system or used with, or embedded within, many different smart devices 104 or peripherals, such as in control panels that control home appliances and systems, in automobiles to control internal functions (e.g., volume, cruise control, or even driving of the car), or as an attachment to a laptop computer to control computing applications on the laptop.

The smart device 104 includes one or more computer processors 202 and at least one computer-readable medium 204, which includes memory media and storage media. Applications and/or an operating system (not shown) embodied as computer-readable instructions on the computer-readable medium 204 can be executed by the computer processor 202 to provide some of the functionalities described herein. The computer-readable medium 204 also includes an application 206, which uses radar data generated by the radar system 102 to perform a function, such as presence detection, gesture-based touch-free control, collision avoidance for autonomous driving, health monitoring, fitness tracking, spatial mapping, human activity recognition, and so forth.

The smart device 104 can also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The smart device 104 may also include a display (not shown).

The smart device 104 includes a radar application programming interface 210 (e.g., radar API 210). The radar application programming interface 210 provides an interface between an external entity, such as an application 206 or another radar system, and the radar system 102. In general, the radar application programming interface 210 provides a standardized language, which the external entity (e.g., the application 206) and the radar system 102 can use to communicate with each other. In some aspects, the radar application programming interface 210 translates various requests provided by one or more external entities (e.g., one or more applications 206) to an operational configuration that the radar system 102 can execute.

Through the radar application programming interface 210, the application 206 can control operations of the radar system 102 and/or receive information from the radar system 102 without having to understand how the radar system 102 works. The radar application programming interface 210 defines the interactions between the application 206 and the radar system 102, including the types of requests and responses available, how to send a request or response, data formats, and other conventions. Also, the radar application programming interface 210 can ensure compliance with other regulations and guidelines, including those provided by agencies such as the Federal Communications Commission (FCC). Sometimes this information is captured in a standards document, which enables a third party to program the application 206 accordingly. For example, the radar application programming interface 210 can define a set of functional blocks that are common across a variety of different types of radar systems 102 and enable non-radar engineers (e.g., developers, hobbyists, and researchers) to apply these functional blocks in unique ways to accomplish different goals. The radar application programming interface 210 can also enable a variety of different applications or external entities to communicate with a variety of different types of radar systems 102 (e.g., radar systems with different hardware designs, operational configurations, and/or performance capabilities).

The radar application programming interface 210 can be implemented in software, programmable hardware, or some combination thereof. The radar application programming interface 210 can be internal to the radar system 102 or external. In some implementations, the radar application programming interface 210 comprises instructions stored within the CRM 204 and executable by the computer processor 202. In other implementations, the instructions for implementing the radar application programming interface 210 are stored within a CRM (e.g., system medium 220) of the radar system 102 and executable by a processor (e.g., system processor 218).

The radar system 102 can implement one or more different types of radar, such as a frequency-modulated continuous-wave (FMCW) radar, a pulse-Doppler radar, a continuous-wave (CW) radar, a phase-modulated spread-spectrum radar, an impulse radar, a radar that uses Zadoff-Chu sequences or constant-amplitude zero-autocorrelation (CASAC) sequences, or a multiple-input multiple-output (MIMO) radar. The radar system 102 includes a communication interface 212 to transmit the radar data to a remote device, though this need not be used when the radar system 102 is integrated within the smart device 104. In general, the radar data provided by the communication interface 212 is in a format usable by the radar application programming interface 210 and the application 206.

The radar system 102 also includes at least one antenna array 214 and at least one transceiver 216 to transmit and receive radar signals. The antenna array 214 includes at least one transmit antenna element and at least one receive antenna element. In some situations, the antenna array 214 includes multiple transmit antenna elements and/or multiple receive antenna elements. With multiple transmit antenna elements and multiple receive antenna elements, the radar system 102 can implement a multiple-input multiple-output radar capable of transmitting multiple distinct waveforms at a given time (e.g., a different waveform per transmit antenna element). The antenna elements can be circularly polarized, horizontally polarized, vertically polarized, or a combination thereof.

Multiple receive antenna elements of the antenna array 214 can be positioned in a one-dimensional shape (e.g., a line) or a two-dimensional shape (e.g., a rectangular arrangement, a triangular arrangement, or an "L" shape arrangement) for implementations that include three or more receive antenna elements. The one-dimensional shape enables the radar system 102 to measure one angular dimension (e.g., an azimuth or an elevation) while the two-dimensional shape enables the radar system 102 to measure two angular dimensions (e.g., to determine both an azimuth angle and an elevation angle of the object). An element spacing associated with the receive antenna elements can be less than, greater than, or equal to half a center wavelength of the radar signal.

The transceiver 216 includes circuitry and logic for transmitting and receiving radar signals via the antenna array 214. Components of the transceiver 216 can include amplifiers, phase shifters, mixers, switches, analog-to-digital converters, or filters for conditioning the radar signals. The transceiver 216 also includes logic to perform in phase/quadrature (I/Q) operations, such as modulation or demodulation. A variety of modulations can be used, including linear frequency modulations, triangular frequency modulations, stepped frequency modulations, or phase modulations. Alternatively, the transceiver 216 can produce radar signals having a relatively constant frequency or a single tone. The transceiver 216 can be configured to support continuous-wave or pulsed radar operations.

A frequency spectrum (e.g., range of frequencies) that the transceiver 216 uses to generate the radar signals can encompass frequencies between 1 and 400 gigahertz (GHz), between 4 and 100 GHz, between 1 and 24 GHz, between 2 and 4 GHZ, between 30 and 80 GHz, between 57 and 64 GHZ, or at approximately 2.4 GHz. In some cases, the frequency spectrum can be divided into multiple sub-spectrums that have similar or different bandwidths. The bandwidths can be on the order of 500 megahertz (MHz), 1 GHZ, 2 GHZ, and so forth. In some cases, the bandwidths are approximately 20% or more of a center frequency to implement an ultrawideband (UWB) radar.

Different frequency sub-spectrums may include, for example, frequencies between approximately 57 and 59 GHZ, 59 and 61 GHZ, or 61 and 63 GHZ. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 216 to generate multiple radar signals, which are transmitted simultaneously or separated in time. In some situations, multiple contiguous frequency sub-spectrums may be used to transmit a single radar signal, thereby enabling the radar signal to have a wide bandwidth.

The radar system 102 also includes one or more system processors 218 and at least one system medium 220 (e.g., one or more computer-readable storage media). The system medium 220 is further described with respect to FIG. 2-2.

FIG. 2-2 illustrates an example system medium 220 of the radar system 102. The system medium 220 includes at least one digital-signal-processing (DSP) module 222, at least one radar-data-processing module 224, and at least one application-programming-interface (API) engine 226. The digital-signal-processing module 222, the radar-data-processing module 224, and/or the application-programming-interface engine 226 can be implemented using hardware, software, firmware, or a combination thereof. In this example, the system processor 218 implements the digital-signal-processing module 222, the data processing module 224, and the application-programming-interface engine 226. In an alternative implementation (not shown), at least one of the digital-signal-processing module 222, the radar-data-processing module 224, or the application-programming-interface engine 226 are included within the computer-readable medium 204 and are implemented by the computer processor 202. For example, the digital-signal-processing module 222 can be included within the system medium 220 and executed by the system processor 218 while the radar-data-processing module 224 and the application-programming-interface engine 226 can be included within the computer-readable medium 204 and executed by the computer processor 202. In this case, the radar system 102 can provide the smart device 104 radar data via the communication interface 212 such that the computer processor 202 can process the radar data.

The digital-signal-processing module 222 performs low-level processing on analog and/or digital samples of a received radar signal to provide real-time signal processing. Example types of signal processing can include non-coherent integration, clutter rejection, detection thresholding, noise cancellation, Doppler filtering, interferometry, and/or digital beamforming. Some functions of the digital-signal-processing module 222 can involve repetitive mathematical operations, such as additions, subtractions, and multiplications. These repetitive mathematical operations can be performed to implement a Fourier transform (e.g., a fast Fourier transform). In an example implementation, the digital-signal-processing module 222 includes a hardware-abstraction module 228. In general, the digital-signal-processing module 222 processes raw data provided by the transceiver 216 and generates pre-processed data in a format that is useable by the radar-data-processing module 224.

The radar-data-processing (RDP) module 224 performs mid-level and/or high-level processing on the pre-processed data received from the digital-signal-processing module 222 to provide real-time data processing. The radar-data-processing module 224 can perform functions such as object tracking, clutter tracking, gesture recognition, presence detection, biometric recognition, navigational aid, and/or health monitoring. These functions can be implemented using heuristic algorithms and/or machine-learning algorithms. In an example implementation, the radar-data-processing module 224 includes an object tracker 230 and a detection module 232.

The digital-signal-processing module 222 and the radar-data-processing module 224 can be designed for compatibility across a variety of different types of radar systems 102, including radar systems 102 with different types of hardware, different hardware configurations, and/or different operational configurations (e.g., FMCW radar, pulse-Doppler radar, or impulse radar). In other words, the digital-signal-processing module 222 and/or the radar-data-processing module 224 can be agnostic, at least by some degree, to the hardware implementation and operation of the radar system 102.

Data generated by the digital-signal-processing module 222 and/or the radar-data-processing module 224 can be self-describing. In some cases, a structure of the data itself describes the format and meaning of the data. In other cases, the digital-signal-processing module 222 and/or the radar-data-processing module 224 can provide information regarding the format and meaning of the data via a query through the radar application programming interface 210.

Example data formats include packed or compressed data formats (e.g., 13-bit integers of a certain quantity), unpacked data formats (e.g., 32-bit float arrays), or dimensions of multidimensional data that is row-interleaved or row-by-row.

Each module (or function) implemented within the digital-signal-processing module 222 and/or the radar-data-processing module 224 can have a defined input and/or output. Some of these inputs and/or outputs can be standardized to enable an external entity (e.g., the application 206) using the radar application programming interface 210 to readily customize operations of the digital-signal-processing module 222 and/or the radar-data-processing module 224 for different use cases and for various radar types. In particular, the external entity can utilize the radar application programming interface 210 to specify an implementation chain (or implementation sequence), which processes samples of a received radar signal and outputs radar data for the application 206. The implementation chain can represent a set of digital-signal-processing modules 222 and/or radar-data-processing modules 224 executed in a particular order. By specifying the implementation chain, the external entity can customize which modules are enabled or disabled, and an order in which these modules operate.

The inputs and/or outputs can be associated with one or more standard rendering planes. In some cases, the input and output of a module can reference a same standard rendering plane. In this case, the module operates on the input data without changing a format of the input data. As such, the output data is in a same format (or associated with a same standard rendering plane) as the input data. In other cases, the input and output of a module can reference different standard rendering planes. Modules associated with a particular type can support a particular input and output. In this case, the module operates on the input data and the format of the input data is transformed to generate the output data. As such, the output data is in a different format (or associated with a different standard rending plane) than the input data.

With knowledge of the standard rending planes associated with a module, engineers can readily swap in or out different modules to operate the radar system 102 in a manner that achieves a desired computation cost, memory cost, configurability, robustness, or performance. Example standard rendering planes can include raw digital samples of a received radar signal for one or more channels, information representative of a range-Doppler map, information representative of a range-Doppler-azimuth-elevation map, information representative of an interferogram, object data (e.g., position information, motion information, and/or physical information about one or more objects), gesture data, biometric data, health data, collision-avoidance data, and so forth. Some rendering planes can include information representative of a module's uncertainty. This uncertainty information can be used by other modules to recognize errors or poor sensing conditions.

Some modules can support multiple standard rendering planes (e.g., support data having alternative representations). As an example, the object tracker 230 can output a grid representation, which can be considered a "dense" representation. In the grid representation, each grid element (or cell) identifies whether or not an object is present at that position. As such, the grid representation can contain additional information about positions that do not contain an object. Alternatively, the object tracker 230 can output a list of objects, which can be considered a "sparse" representation. In the list of objects, each listed object can include information about its grid position. The list of objects can have a smaller memory size than the grid representation because the list of objects may not include information about grid elements that do not contain an object. In this case, the external entity can utilize the radar application programming interface 210 to specify an appropriate standard rending plane depending on whether or not downstream modules can utilize the additional information provided by the grid representation.

The application-programming-interface engine 226 can act as an interface between the radar application programming interface 210 and components of the radar system 102 (e.g., the antenna array 214, the transceiver 216, and/or the system processor 218). In some cases, the application-programming-interface engine 226 modifies an operation of the radar system 102 according to requests received by the radar application programming interface 210. For example, the application-programming-interface engine 226 can activate a particular quantity of antenna elements within the antenna array 214 or cause the transceiver 216 to generate a particular type of radar signal specified by the radar application programming interface 210. As another example, the application-programming-interface engine 226 can cause the system processor 218 to execute an implementation chain specified by the radar application programming interface 210 and/or cause a module within the implementation chain to operate with one or more parameters provided by the radar application programming interface 210.

The application-programming-interface engine 226 can also provide information to the radar application programming interface 210, which the radar application programming interface 210 can pass along to the application 206. Optionally, the application-programming-interface engine 226 can reformat data received from or provided to the radar application programming interface 210. Operations of the hardware-abstraction module 228, the object tracker 230, and the detection module 232 are further described below.

The hardware-abstraction module 228 transforms raw data provided by the transceiver 216 into hardware-agnostic data. The hardware-agnostic data can be processed by the object tracker 230 and/or the detection module 232. In particular, the hardware-abstraction module 228 conforms complex data from a variety of different types of radar signals to an expected input. This enables the object tracker 230 or the detection module 232 to process different types of radar signals received by the radar system 102, including those that utilize different modulations schemes for frequency-modulated continuous-wave radar, phase-modulated spread spectrum radar, or impulse radar. The hardware-abstraction module 228 can also normalize complex data from radar signals with different center frequencies, bandwidths, transmit power levels, or pulsewidths.

Additionally, the hardware-abstraction module 228 conforms complex data generated using different hardware architectures. Different hardware architectures can include different antenna arrays 214 positioned on different surfaces of the smart device 104 or different sets of antenna elements within an antenna array 214. By using the hardware-abstraction module 228, downstream modules can process complex data generated by different sets of antenna elements with different gains, different sets of antenna elements of various quantities, or different sets of antenna elements with different antenna element spacings. Furthermore, the hardware-abstraction module 228 enables these downstream modules to operate in radar systems 102 with different limitations that affect the available radar modulation schemes, transmission parameters, or types of hardware architectures.

The object tracker 230 identifies objects within an external environment and compiles a history of each object's behavior. In particular, the object tracker 230 can compile information about an object's position (e.g., distance and/or angle), motion (e.g., range rate and/or velocity), physical characteristics (e.g., size, radar cross section, and/or material composition), or some combination thereof. The object tracker 230 can be implemented using a variety of different tracking algorithms, including those associated with an alpha-beta tracker, a Kalman filter, or a multiple hypothesis tracker (MHT).

The detection module 232 can analyze data provided by the object tracker 230 for one or more use cases, such as gesture recognition, presence detection, collision-avoidance, health monitoring, and so forth. For gesture recognition, the detection module 232 recognizes gestures and can distinguish between motions associated with gestures and non-gestures. The detection module 232 is further described with respect to FIG. 10. In some implementations, the detection module 232 is implemented as a state machine.

Although not explicitly shown, the system medium 220 or the computer-readable medium 204 can also include a sensor-fusion module, a radar communication module, a data collection module, a data visualization tool, and/or a radar simulator. The sensor-fusion module can combine data from the radar system 102 with data provided by an external sensor, such as another radar system or another type of sensor (e.g., a camera).

The radar communication module enables the radar system 102 to communicate with another entity that is external to the smart device 104, such as with a radar system of another smart device 104. With direct communication, these radar systems can configure each other to support bistatic radar sensing, utilize techniques such as triangulation, enable faster acquisition of objects of interest, and/or maintain tracking on objects of interest that become temporarily obscured but are detected by the other radar system. With the radar communication module, the radar systems can share information and improve performance in a variety of different environments and situations.

The data collection module can record data that is available to the system processor 218 for system development and integration. Example data can include data provided by the transceiver 216 or data generated by the digital-signal-processing module 222, the radar-data-processing module 224, and/or the application-programming-interface engine 226. In some cases, the data collection module captures raw data provided by the transceiver 216 and does not perform additional functions to reduce computational costs.

The data visualization tool can provide a visual depiction of the data collected using the data collection module. In this way, the data visualization tool can make it easier for a developer of the application 206 to view and understand the data generated by the radar system 102. In an example implementation, the data visualization tools tags the data with labels describing the environment or activity that the data contains. In another example implementation, the data visualization tool graphically depicts some of the data generated by the radar system 102, such as information representative of a range-Doppler map or information representative of movement of an object. Other data visualization tools can depict operational aspects of the radar system 102, such as a field-of-view employed by the radar system 102, a radar transmit signal generated by the radar system 102, or an antenna pattern of the radar system 102.

The radar simulator can inject virtual data into the digital-signal-processing module 222, the radar-data-processing module 224, and/or the application-programming-interface engine 226. The virtual data can include data provided by an external source or simulated data generated by the radar simulator. In some implementations, the radar simulator can generate the simulated data by rendering a virtual environment with objects and/or clutter and analyzing the interaction of virtual radar waves within the virtual environment. The radar simulator can also be able to inject noise to help algorithm developers and integration test engineers understand an impact that noise sources might have on the performance of the radar system 102. With the radar simulator, a developer of the application 206 can determine the feasibility of utilizing the radar system 102 for a particular use case. The radar application programming interface 210 is further described with respect to FIG. 3-1.

Figures 1, 3:
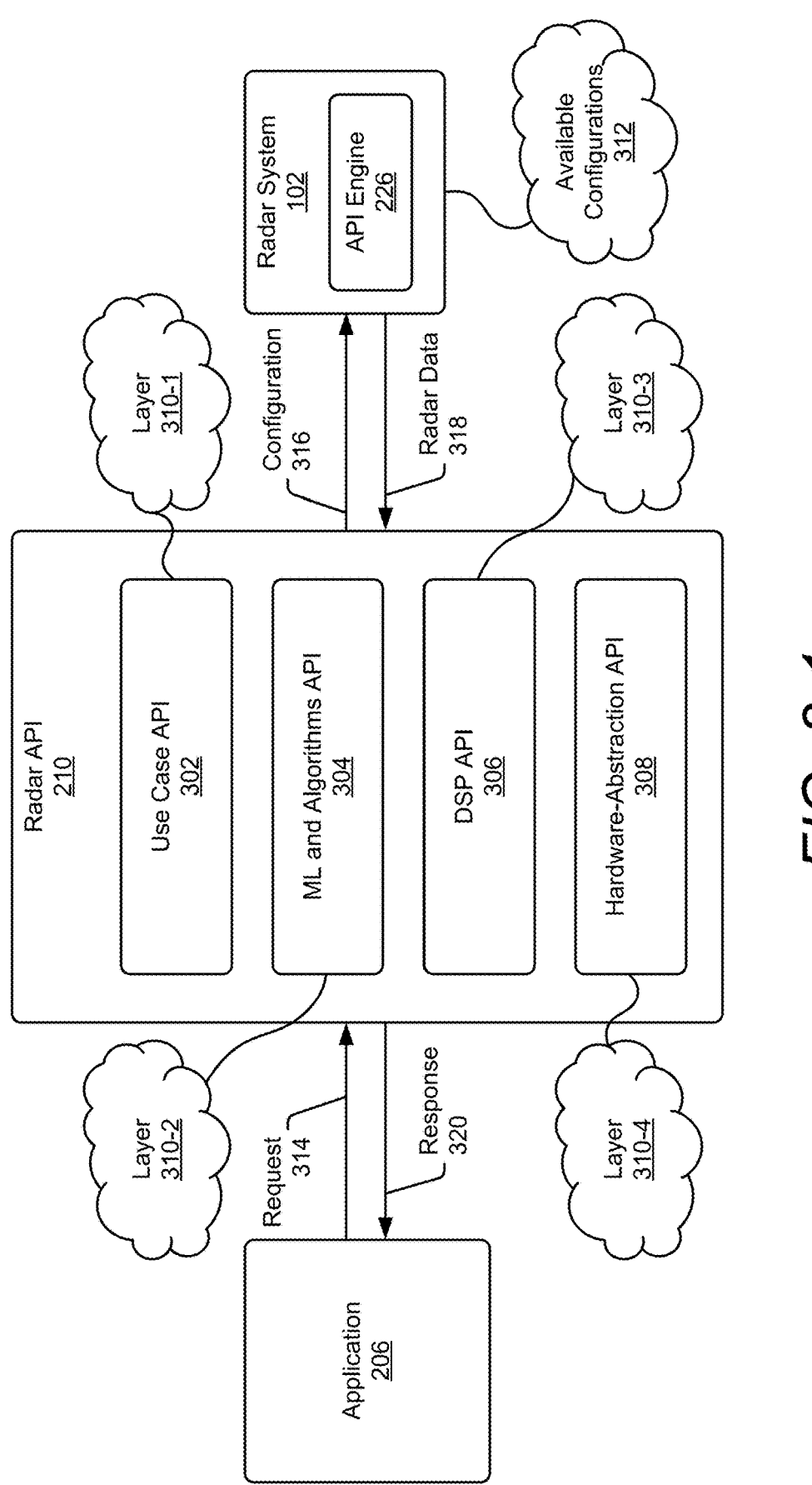
Figures 2, 3:
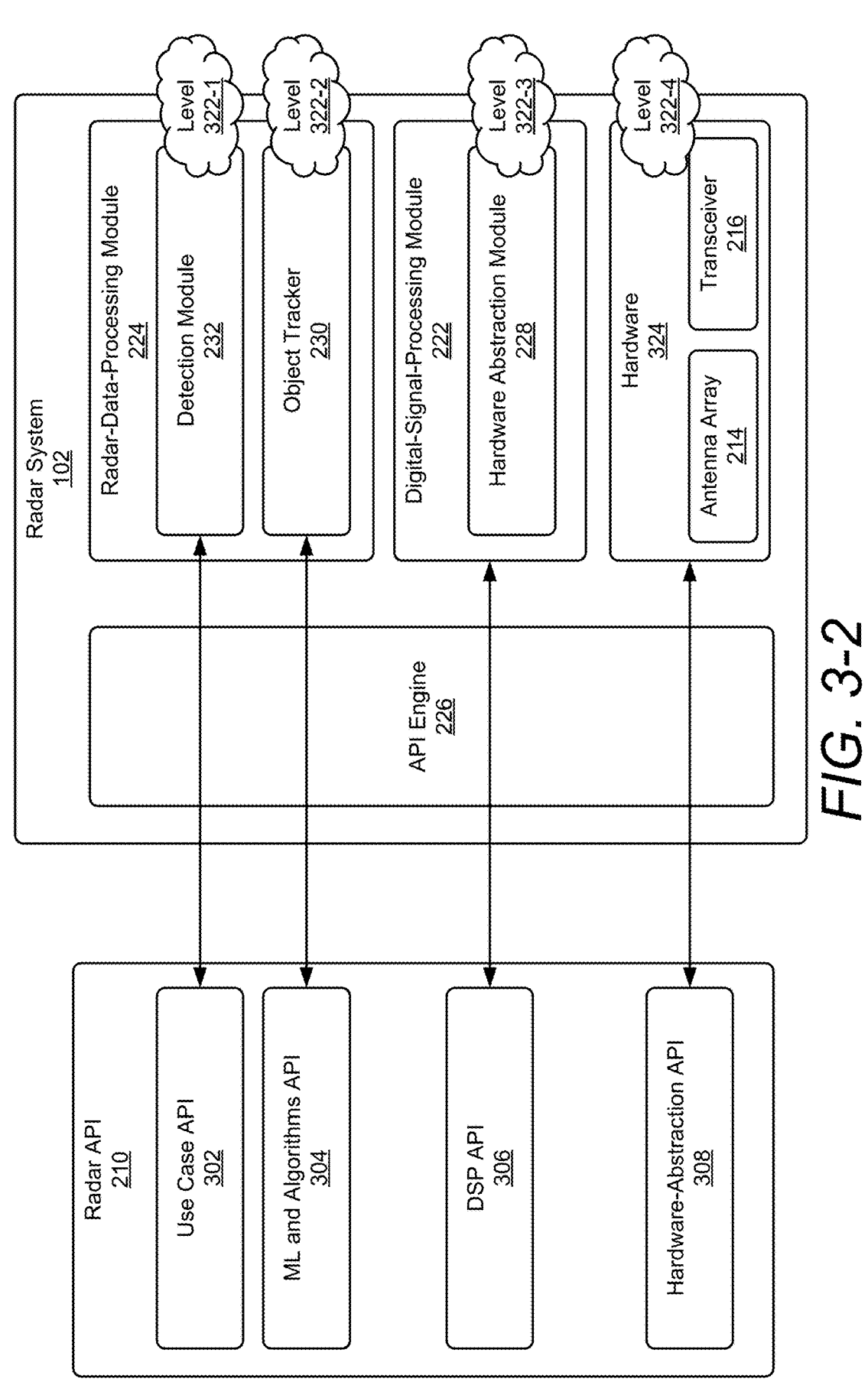

FIG. 3-1 illustrates an example radar application programming interface 210. Sometimes, the radar application programming interface 210 can include multiple application programming interfaces, which enables the application 206 to communicate with different operational levels of the radar system 102. The multiple application programming interfaces can represent multiple layers or levels of the radar application programming interface 210. As an example, the radar application programming interface 210 can include a use case application programming interface 302 (use case API 302), a machine-learning (ML) and algorithms application programming interface 304 (ML and algorithms API 304), a digital-signal-processing (DSP) application programming interface 306 (DSP API 306), a hardware-abstraction application programming interface 308 (hardware-abstraction API 308), or some combination thereof.

The radar application programming interface 210 can be described in terms of multiple layers 310, where each layer is associated with a particular operational level of the radar system 102, as further described with respect to FIG. 3-2. In general, the upper layers of the radar application programming interface 210 are designed to enable engineers with less radar experience and knowledge to readily interact with the higher operational levels of the radar system 102. The lower layers of the radar application programming interface 210 are designed to enable engineers with more radar experience and knowledge to control the lower operational levels of the radar system 102.

The use case application programming interface 302 represents a first layer 310-1 (or upper layer) of the radar application programming interface 210. The use case application programming interface 302 can enable non-radar engineers to interface with the radar system 102 without knowing the lower-level details regarding the operation of the radar system 102 and/or the capabilities of the radar system 102 from a hardware or software perspective. The use case application programming interface 320 can standardize interactions between the application 206 and the radar system 102 for a variety of use cases, including gesture recognition, presence detection, biometric recognition, navigational aid, and/or health monitoring.

The machine-learning and algorithms application programming interface 304 represents a second layer 310-2 (or an upper-middle layer) of the radar application programming interface 210. Using the machine-learning and algorithms application programming interface 304, engineers with some radar knowledge can build and train machine-learning models within the radar system 102. Additionally, the machine-learning and algorithms application programming interface 304 can enable these engineers to customize core algorithms that enable the radar system 102 to analyze high-level radar data (e.g., pre-processed radar data).

The digital-signal-processing application programming interface 306 represents a third layer 310-3 (e.g., a lower-middle layer) of the radar application programming interface 210. The digital-signal-processing application programming interface 306 can define a library of functions that the radar system 102 can execute to process raw data. These functions can generate spectrograms, calculate Doppler, perform digital beamforming, and so forth. Using the digital-signal-processing application programming interface 306, engineers with some radar knowledge can customize the digital signal processing performed by the radar system 102.

The hardware-abstraction application programming interface 308 represents a fourth layer 310-4 (e.g., a lower layer) of the radar application programming interface 308. The hardware-abstraction application programming interface 308 can abstract specifics of a hardware implementation of the radar system 102 and enable a standardized output that is independent of the hardware of the radar system 102. Using the hardware-abstraction application programming interface 308, engineers with radar knowledge can customize the operation and configuration of hardware within the radar system 102, including the antenna array 214 and/or the transceiver 216.

Sometimes the radar system 102 can operate according to a variety of one or more available configurations 312. In some cases, these configurations 312 are derived from limitations of the radar system 102 and/or limitations of the smart device 104. Some limitations are considered fixed limitations, which are unlikely to vary over time. For instance, a fixed limitation can be based on hardware limitations associated with the radar system 102 (e.g., associated with the antenna array 214, the transceiver 216, and/or the system processor 218). Example fixed limitations include available frequency bands, bandwidths, transmit power levels, antenna configurations, and/or duplex configurations of the radar system 102. Other limitations are considered dynamic limitations, which can vary over time. Example dynamic limitations include an amount of available power (e.g., a battery level of the smart device 104), an amount of available memory (e.g., a size of the system medium 220 or the computer-readable medium 204), and/or an amount of processing capacity (e.g., a processing capacity of the system processor 218 or the computer processor 202).

The available configuration 312 represents an operational configuration of the radar system 102 for generating a radar signal, transmitting the radar signal, receiving the reflected radar signal, and/or processing the reflected radar signal. In some cases, the available configuration 312 specifies adjustable characteristics of the radar signal, such as a carrier frequency, a bandwidth, a radar waveform (e.g., a modulation type), and/or a transmit power level. The available configuration 312 can also include a hardware configuration of the radar system 102, a software configuration of the radar system 102, radar-sensing performance metrics of the radar system 102, available resources of the radar system 102 and/or the smart device 104, or some combination thereof. The available configurations 312 can include at least one default configuration.

An example hardware configuration includes an antenna configuration, such as a single antenna for transmission and reception, a phased array for transmission and/or reception, or MIMO operation. Another example hardware configuration includes a duplex configuration, such as a half-duplex configuration to implement a pulsed-Doppler radar or a full-duplex configuration to implement a frequency-modulated continuous-wave radar.

Example software configurations can include a radar-signal-processing configuration. The radar-signal-processing configuration specifies the signal-processing techniques the radar system 102 can employ to determine explicit information about an object. Some radar-signal-processing configurations can be tailored to be less complex and utilize less memory. For example, a first radar-signal-processing configuration performs a Fourier transform (e.g., a fast Fourier transform (FFT)) and uses a detection threshold algorithm. With these techniques, the first radar-signal-processing configuration can detect the object and measure a distance to the object. Other radar-signal-processing configurations can be more complex and utilize more memory in order to reduce false alarms and improve accuracy. For example, a second radar-signal-processing configuration can include a clutter tracker to monitor clutter, a tracking algorithm to improve a likelihood of detecting the object and to improve measurement accuracy, and/or a digital beamformer to measure one or more angles to the object.

In one aspect, the radar application programming interface 210 can enable engineers to configure the radar system 102 according to one of the available configurations 312. In another aspect, the radar application programming interface 210 can enable engineers to reference the available configurations 312 and create new custom configurations based on the available configurations 312.

During operation, the application 206 sends a request 314 to the radar application programming interface 210. The request 314 can specify a particular operational configuration of the radar system 102 or request particular information from the radar system 102. Example types of information can include a list of available configurations 312, performance capabilities of the radar system 102, a particular type of data collected by the radar system 102, or an error report. The request 314 can apply to the use case application programming interface 302, the machine-learning and algorithms application programming interface 304, the digital-signal-processing application programming interface 306, and/or the hardware-abstraction application programming interface 308. Some requests 314 can reset or restart the radar system 102.

The radar application programming interface 210 can map the request 314 to a configuration 316 (e.g., one of the available configurations 312) of the radar system 102. Sometimes, the radar application programming interface 210 can receive multiple requests 314 from the application 206 or a variety of different applications. The radar system 102 can process these requests 314 together and determine an appropriate configuration 316 of the radar system 102 that satisfies the multiple requests 314. In this way, the radar application programming interface 210 enables the radar system 102 to efficiently provide radar sensing for a variety of different applications 206 or use cases. The radar system 102 receives this configuration 316 and operates accordingly.

The radar system 102 sends radar data 318 to the radar application programming interface 210. The radar data 318 can indicate whether a particular gesture was detected or include data that is collected by the radar system 102 (e.g., raw digital samples of received signals or data representative of range-Doppler maps). Responsive to receiving the radar data 318, the radar application programming interface 210 can format the radar data 318 and provide a response 320 to the application 206. In some cases, the response 320 can include the radar data 318. The response 320 can also include error reports associated with false-positives. With this information, the application 206 can make appropriate adjustments to the request 314 to reduce the false-positives. The various application programming interfaces can be associated with different operational levels of the radar system 102, as further described with respect to FIG. 3-2.

FIG. 3-2 illustrates example relationships between multiple layers 310-1 to 310-4 of the radar application programming interface 210 and operational levels 322-1 to 322-4 of the radar system 102. In the depicted configuration, the radar system 102 is associated with multiple levels 322 (or operational levels). In general, the upper levels 322 include modules that operate on higher-level radar data (e.g., pre-processed radar data). During reception, these modules can be executed towards the end of a receive process to generate the radar data 318 requested by the application 206. The lower levels 322 can include modules that operate on lower-level radar data (e.g., raw radar data). During reception, these modules can be executed towards the beginning of a receive process (or at least before the modules associated with the upper levels 322). The lower levels 322 can also involve hardware configurations of the radar system 102.

As shown in FIG. 3-2, the radar-data-processing module 224 is associated with a first level 322-1 (e.g., a first operational level) and a second level 322-2 (e.g., a second operational level) of the radar system 102. In particular, the detection module 232 is associated with the first level 322-1, and the object tracker 230 is associated with the second level 322-2. The digital-signal-processing module 222 is associated with a third level 322-3 (e.g., a third operational level) of the radar system 102. Hardware 324 of the radar system 102, which includes the antenna array 214 and the transceiver 216, is associated with a fourth level 322-4.

Each layer 310 of the radar application programming interface 210 can be associated with one or more levels 322 of the radar system 102. In particular, each layer 310 of the radar application programming interface 210 can communicate with the corresponding level 322 of the radar system 102 either directly or indirectly via the application-programming-interface engine 226. Through these communications, each layer 310 of the radar application programming interface 210 can manage operational parameters and/or modules associated with the corresponding level 322 of the radar system 102. The radar application programming interface 210 can also extract information from the corresponding level 322 of the radar system 102 and/or customize the input and/or outputs of modules associated with the corresponding level 322.

In this example, the use case application programming interface 302 is associated with the detection module 232. With this relationship, the user case application programming interface 302 can customize the operation of the radar system 102 for gesture recognition, presence detection, biometric recognition, collision-avoidance, health monitoring, and so forth. In particular, the use case application programming interface 302 can specify different states of the detection module 232, as further described with respect to FIG. 10.

The machine-learning and algorithms application programming interface 304 is associated with the object tracker 230. With this relationship, the machine-learning and algorithms application programming interface 304 can customize operation of the object tracker 230 and specify the output format of the object tracker 230.

The digital-signal-processing application programming interface 306 is associated with the digital-signal-processing module 222 (or the hardware abstraction module 228). With this relationship, the digital-signal-processing application programming interface 306 can customize the digital-signal-processing operation of the radar system 102, which can include clutter rejection, noise cancellation, detection thresholding, Doppler filtering, interferometry, and/or digital beamforming. The digital-signal-processing application programming interface 306 can also specify features such as integration time and update rate.

The hardware-abstraction application programming interface 308 is associated with the hardware 324. With this relationship, the hardware-abstraction application programming interface 308 can tailor operation of the antenna array 214 and/or the transceiver 216. For example, the hardware-abstraction application programming interface 308 can specify waveform parameters of a transmitted radar signal, such as transmit power, frequency, bandwidth, modulation type (e.g., frequency or phase modulation). The hardware-abstraction application programming interface 308 can also specify a radiation pattern (e.g., direction and/or beamwidth of a main lobe), pulse width, pulse repetition frequency (PRF) (e.g., inter-pulse period (IPP)), quantity of pulses, duty cycle, or polarization (e.g., horizontal polarization, vertical polarization, and/or circular polarization), and so forth.

In some cases, the hardware-abstraction application programming interface 308 can enable an external party to specify higher-level operational aspects of the radar system 102, such as detection range, and map it to one or more operational parameters, such as transmit power. As another example, the hardware-abstraction application programming interface 308 can enable users to specify a resolution (e.g., range, Doppler, and/or angle), and map it to one or more operational parameters (e.g., bandwidth, integration time, or quantity of active antenna elements). Operations of the radar application programming interface 120 and the radar system 102 for supporting gesture recognition are further described with respect to FIGS. 4-10.

Figure 4:
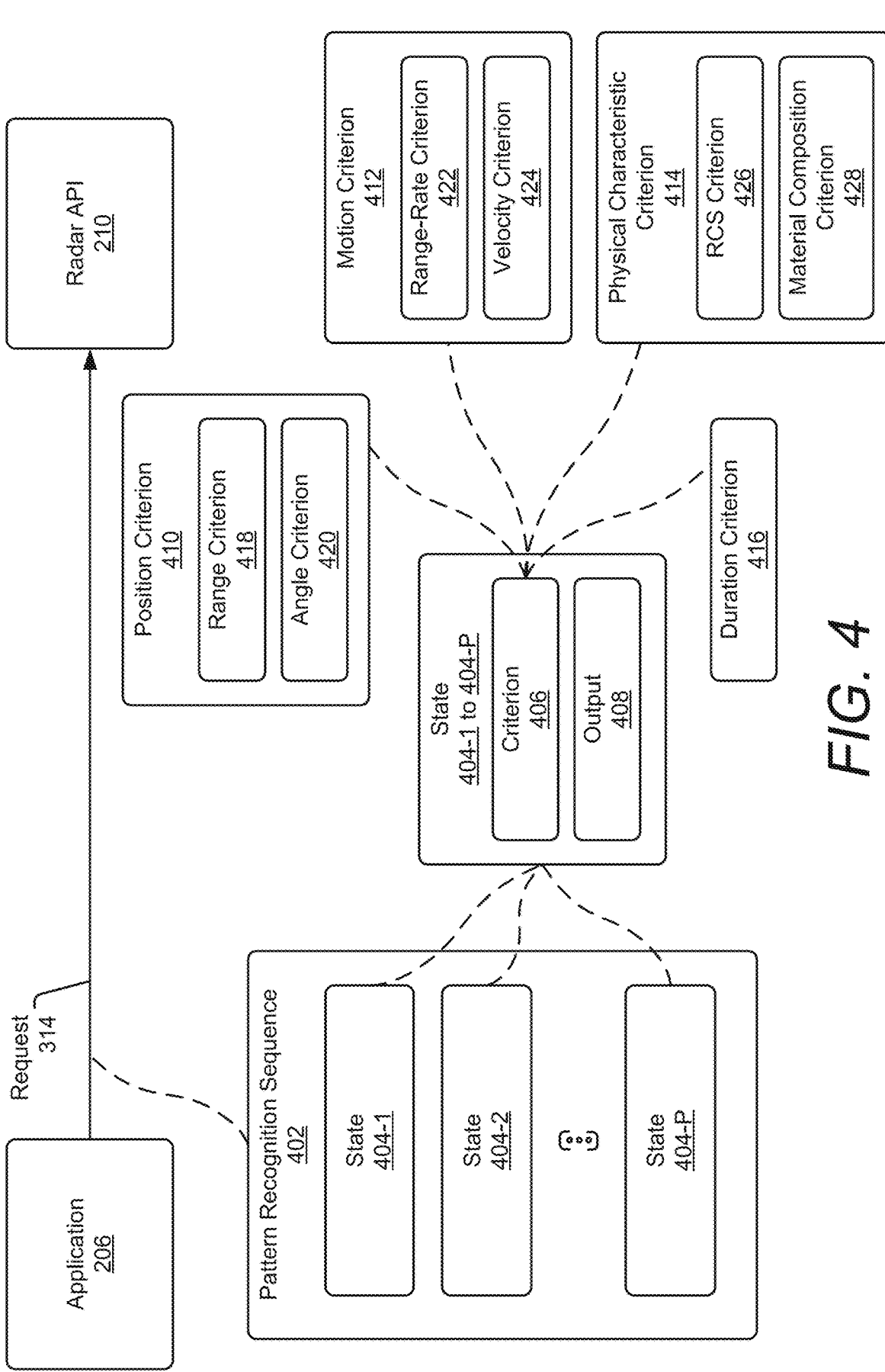
FIG. 4 illustrates an example request provided by an application to a radar application programming interface for gesture recognition.

FIG. 4 illustrates an example request 314 generated by the application 206 and provided to the radar application programming interface 210 for gesture recognition. In this example, the radar application programming interface 210 can represent the use case application programming interface 302. The radar application programming interface 210 enables the application 206 to customize operation of the radar system 102 for gesture recognition. In this way, the application 206 can control the types of gestures the radar system 102 can detect as well as a false-positive rate of the radar system 102 (e.g., a rate at which the radar system 102 mistakenly recognizes other motions as being gestures).

For gesture recognition, the application 206 sends the request 314 to the radar application programming interface 210. The request 314 includes a pattern recognition sequence 402, which specifies a sequence of behavioral states of an object as it performs a gesture. A gesture progresses through at least two states. Each state can describe one or more characteristics (or features) of the object performing the gesture that can be measured or determined using radar sensing. For example, each state can describe a relative or absolute position of the object performing the gesture, a motion associated with the object performing the gesture (e.g., a range rate, a velocity, an acceleration, or any derivative thereof), an orientation or radar cross section of the object performing the gesture, a composition of the object performing the gesture, and/or some combination thereof.

Each pattern recognition sequence 402 at least includes a beginning state, which describes a starting behavior or a starting feature of the gesture, and an end state, which describes an ending behavior or an ending feature of the gesture. Depending on the complexity of the gesture, some pattern recognition sequences 402 can also include one or more intermediate states, which describe one or more behaviors or features of the gesture that occur between the beginning and end states. Using the pattern recognition sequence 402, the application 206 can define a gesture in such a way that differentiates it from other types of motions or gestures. In this way, the application 206 can control a sensitivity of the radar system 102 for detecting a particular gesture and the ability of the radar system 102 to ignore other motions that are not associated with the gesture.

Increasing the sensitivity can enable the radar system 102 to detect a gesture performed by a variety of different users with different variations. For example, some users may perform a gesture using different speeds or using different degrees of subtlety or exaggeration. Increasing the sensitivity can also enhance accessibility for disabled people to perform the gesture. However, increasing the sensitivity can also cause the radar system 102 to generate false-positives. For example, the radar system 102 may accidentally detect a gesture based on a user performing other motions not related to the gesture, such as vacuuming, walking with the smart device 104, walking a dog next to the smart device 104, folding clothes next to the smart device 104, making a bed next to the smart device 104, washing dishes next to the smart device 104, repositioning an object that is proximate to the smart device 104, and so forth. By defining the pattern recognition sequence 402, the application 206 can control the sensitivity level of the radar system 102 and manage the false-positive rate of the radar system 102.

The pattern recognition sequence 402 includes states 404-1, 404-2 . . . 404-P, where P represents a positive integer. Each state 404-1 to 404-P defines a behavior of an object during a portion of a gesture. Individual states 404-1 to 404-P can include at least one criterion 406 and can optionally pass along one or more outputs 408. The criterion 406 can include one or more entrance criteria, one or more exit criteria, or some combination thereof. The entrance criterion represents criterion for entering the state 404-1 to 404-P, and the exit criterion represents criterion for exiting the state 404-1 to 404-P. Each criterion 406 can specify a threshold, a conditional comparison (e.g., greater than, less than, or equal to), logic operations (e.g., ANDs, ORs, or NOTs), a range of valid values, or a delta change (e.g., displacement).

Example criterion 406 include position criterion 410, motion criterion 412, physical characteristic criterion 414, and duration criterion 416. The position criterion 410 includes criterion associated with a position of an object performing the gesture. For example, the position criterion 410 can include range criterion 418 (e.g., distance criterion or slant-range criterion) or angle criterion 420 (e.g., azimuth criterion and/or elevation criterion).

The motion criterion 412 includes criterion associated with a motion of an object performing the gesture. For example, the motion criterion 412 can include range-rate criterion 422 or velocity criterion 424. As another example, the motion criterion 412 can include acceleration or jerk criterion (not shown). The range-rate criterion 422 can be based on a Doppler-determined range rate or a range-determined range rate.

The physical characteristic criterion 414 includes criterion associated with a physical characteristic of the object performing the gesture. For example, the physical characteristic criterion 414 can include a radar-cross-section (RCS) criterion 426 (RCS criterion 426), which describes the behavior of the object's radar cross section. Additionally or alternatively, the physical characteristic criterion 414 can include a material composition criterion 428, which describes a composition of the object (e.g., human tissue, metal, wood, or cloth). Although not shown, the physical characteristic criterion 414 can also include a criterion associated with a size or dimension of the object.

The duration criterion 416 specifies a duration in which at least one other criterion is satisfied. This duration can be specified in terms of a time interval or a quantity of radar frames (e.g., instances) that the object is detected by the radar system 102.

The output 408 enables a current state 404 to pass on information to a next state 404 within the pattern recognition sequence 402. Example outputs 408 can include position information (e.g., range or angle), motion information (e.g., Doppler frequency, range rate, or velocity), or physical information (e.g., size, radar cross section, material composition). By receiving the output 408, the next state 404 can evaluate whether or not a behavior of the object remains relatively similar to the previous state or changes throughout the gesture.

In general, the pattern recognition sequence 402 can include any quantity of states 404-1 to 404-P, which enables the pattern recognition sequence 402 to define simple or complex gestures. Simple gestures, such as a reach gesture, can have fewer states 404 relative to more complex gestures, such as a pump gesture or sign language. The criterion 406 of each state 404-1 to 404-P can allow for tight or loose tolerances, which affects a sensitivity and false-positive rate of the radar system 102 for detecting the gesture. Example pattern recognition sequences 402 are further described with respect to various gestures in FIGS. 5-1 to 7-2.

Figures 1, 5:
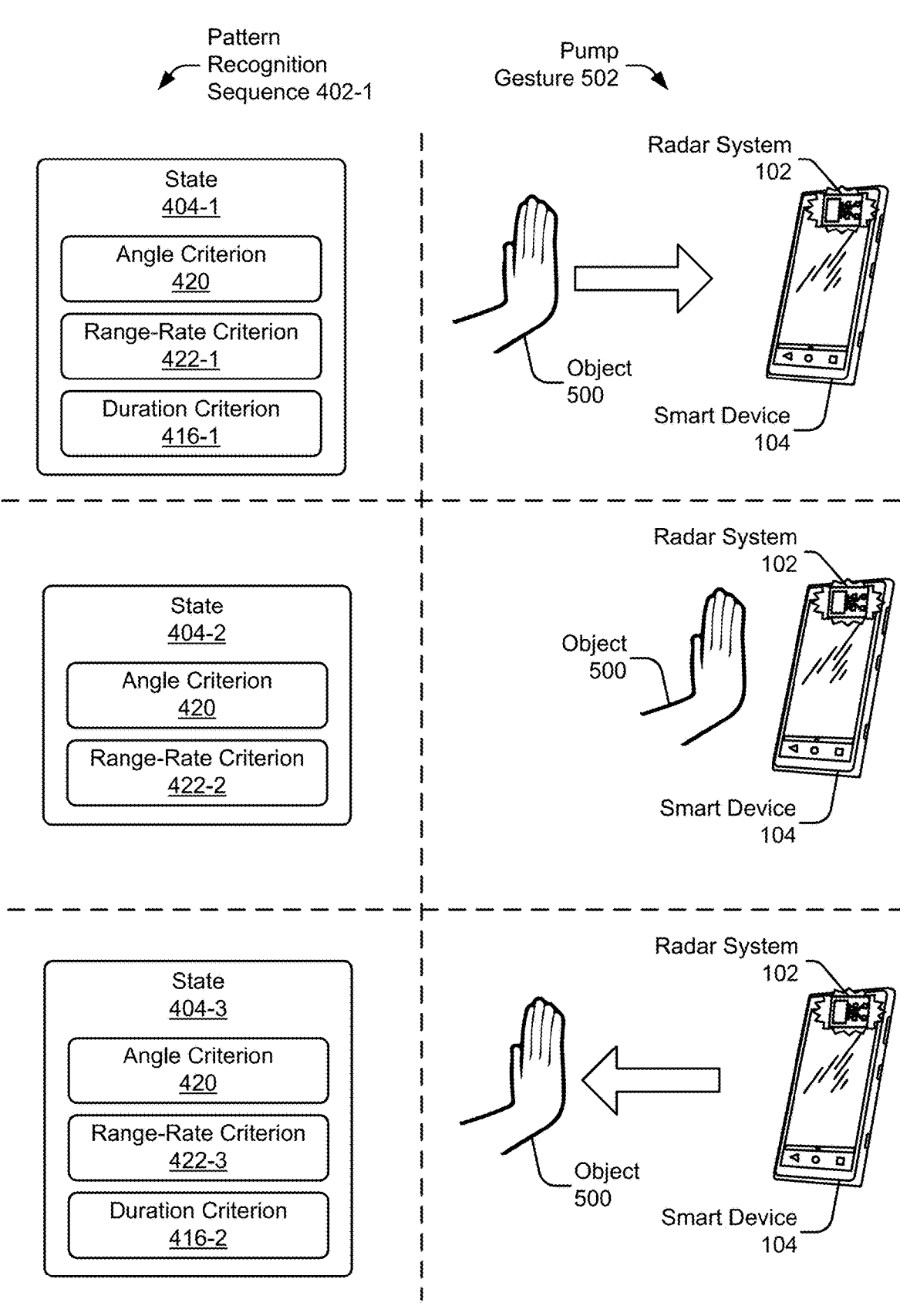
Figures 2, 5:
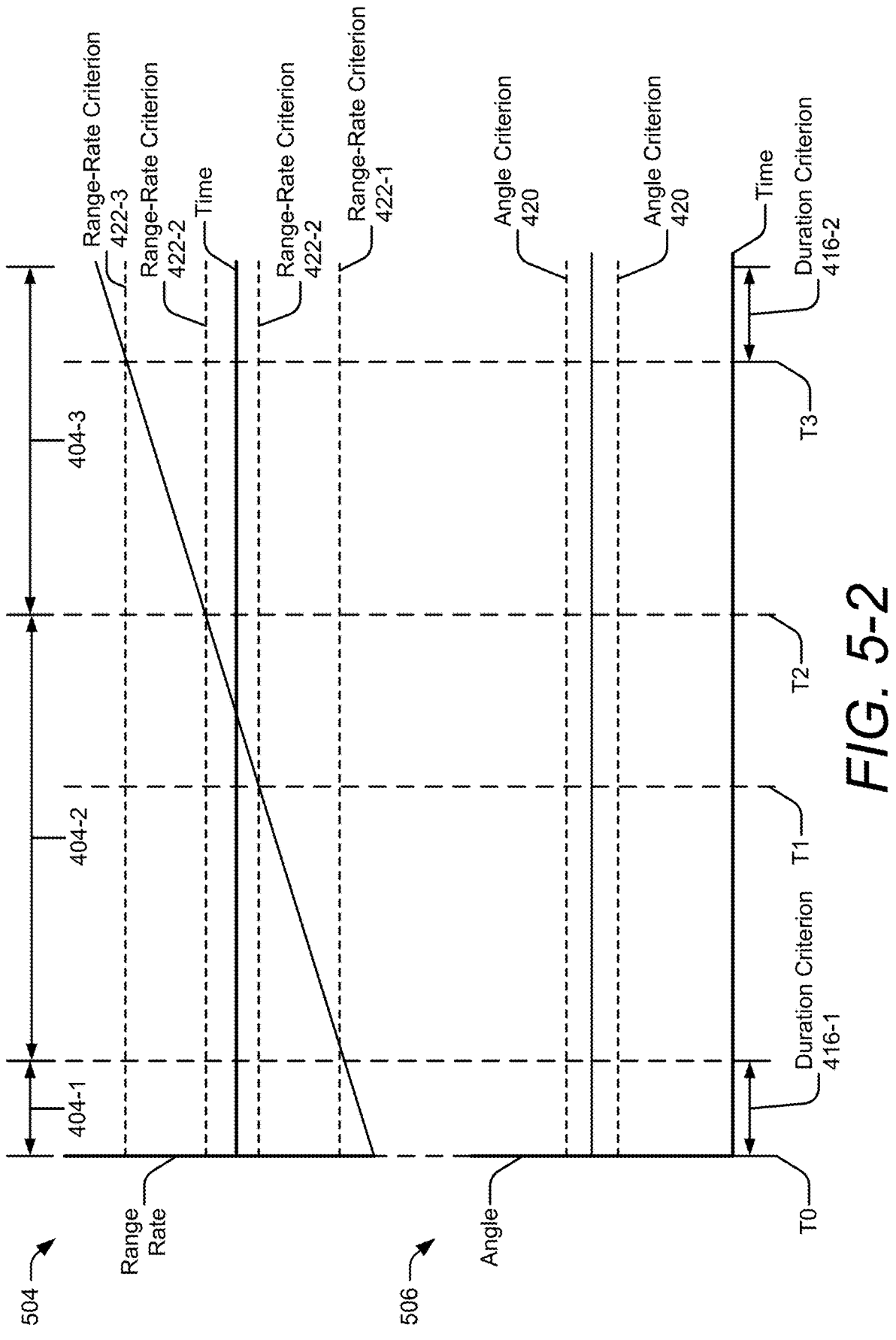

FIG. 5-1 illustrates an example pattern recognition sequence 402-1 associated with an object 500 performing a pump gesture 502. To perform the pump gesture 502, the object 500 moves towards the smart device 104 and moves away from the smart device 104 at approximately a constant angle relative to the radar system 102. In FIG. 5-1, the object 500 is shown to be a person's hand. However, other types of objects, including inanimate objects, can alternatively be used.

In this example, the pattern recognition sequence 402-1 includes states 404-1, 404-2 and 404-3. The state 404-1 includes angle criterion 420, range-rate criterion 422-1, and duration criterion 416-1, which characterize a behavior of the object 500 as it approaches the smart device 104. The state 404-2 includes angle criterion 420 and range-rate criterion 422-2, which characterize a behavior of the object 500 as it slows down at a short distance from the smart device 104. The state 404-3 includes angle criterion 420, range-rate criterion 422-3, and duration criterion 416-2, which characterize a behavior of the object 500 as it moves away from the smart device 104.

The criterion across the states 404-1 to 404-3 can be similar, such as in the case of the angle criterion 420, or different, such as in the case of the range-rate criterion 422-1, 422-2, and 422-3. To reduce false-positives, the states 404-1 to 404-3 can include other criteria. For example, the states 404-1 to 404-3 can include the radar-cross-section criterion 426 to distinguish between a pump gesture 502 made with fingers pointing in a direction that is perpendicular to the motion of the hand or another pump gesture 502 made with the fingers curled into a fist. As another example, the states 404-1 to 404-3 can include the material composition criterion 428 to distinguish between a pump gesture 502 made with a hand and a pump gesture 502 made with a stylus. The criteria 406 associated with the states 404-1 to 404-3 are further described with respect to FIG. 5-2.

FIG. 5-2 illustrates example behavior of the object 500 performing the pump gesture 502. A graph 504 depicts a range rate of the object 500 over a duration of the pump gesture 502. The range rate can be determined based on a measured Doppler frequency or changes in a measured range (e.g., distance) of the object 500. In this case, the range rate changes from a negative value to a positive value. A graph 506 depicts an angle of the object 500 over a duration of the pump gesture 502. In this case, the angle remains relatively constant, which is a characteristic of the pump gesture 502. For this example, consider that the criteria 406 of the states 404-1 to 404-3 represent exit criteria.

At time T0, the object 500 has a range rate that is less than the range-rate criterion 422-1 of the state 404-1. The object 500 also has an angle that stays within a margin specified by the angle criterion 420 of the state 404-1. In this case, the object 500 can be at any angle so long as the angle doesn't vary significantly (e.g., doesn't vary more than the specified margin). The object 500 satisfies the range-rate criterion 422-1 and the angle criterion 420 for a duration specified by the duration criterion 416-1. As such, a first portion of the pump gesture 502 is characterized by the state 404-1.

Between time T1 and T2, the range rate of the object 500 is between the thresholds specified by the range-rate criterion 422-2 of the state 404-2. These thresholds enable the range-rate criterion 422-2 to capture the range rate changing signs (e.g., going from negative to positive). This indicates that the object 500 changes directions from traveling towards the smart device 104 to traveling away from the smart device 104. Also, the angle of the object 500 remains within the angle criterion 420. In this manner, a second portion of the pump gesture 502 is characterized by the state 404-2.

At time T3, the range rate of the object 500 is greater than the range-rate criterion 422-3 of the state 404-3. Also, the angle of the object 500 remains within the angle criterion 420. The object satisfies the range-rate criterion 422-3 and the angle criterion 420 for a duration specified by the duration criterion 416-2. In this manner, a third portion of the pump gesture 502 is characterized by the state 404-3.

By recognizing objects that satisfy the criteria of states 404-1, 404-2, and 404-3 in sequence, the radar system 102 can recognize the pump gesture 502, and the radar application programming interface 210 can send a response 320 to the application 206 indicating that the pump gesture 502 occurred. The application 206 can perform an action responsive to receiving the response 320. For example, the application 206 can stop a timer, click a button, activate a selected option, or pause media.

Some applications 206 may add additional criterion 406 within one or more of the states 404-1 to 404-3 or tighten tolerances of the criterion 406 to reduce false-positives. For example, the application 206 can add a range criterion 418 to the state 404-2 to require the object 500 to be within a minimum distance from the smart device 104. As another example, the application 206 can add the radar-cross-section criterion 426 or material composition criterion 428 to the states 404-1 to 404-3 to distinguish between a pump gesture 502 performed by a user and the flipping of bedsheets as the user makes their bed next to the smart device 104. As yet another example, the range-rate criterion 422-1 and 422-3 can be set appropriately to enable detection of the pump gesture 502 and reject detections associated with vacuuming, which can have slower range rates that fail to satisfy the range-rate criterion 422-1 or 422-3.

Figures 1, 6:
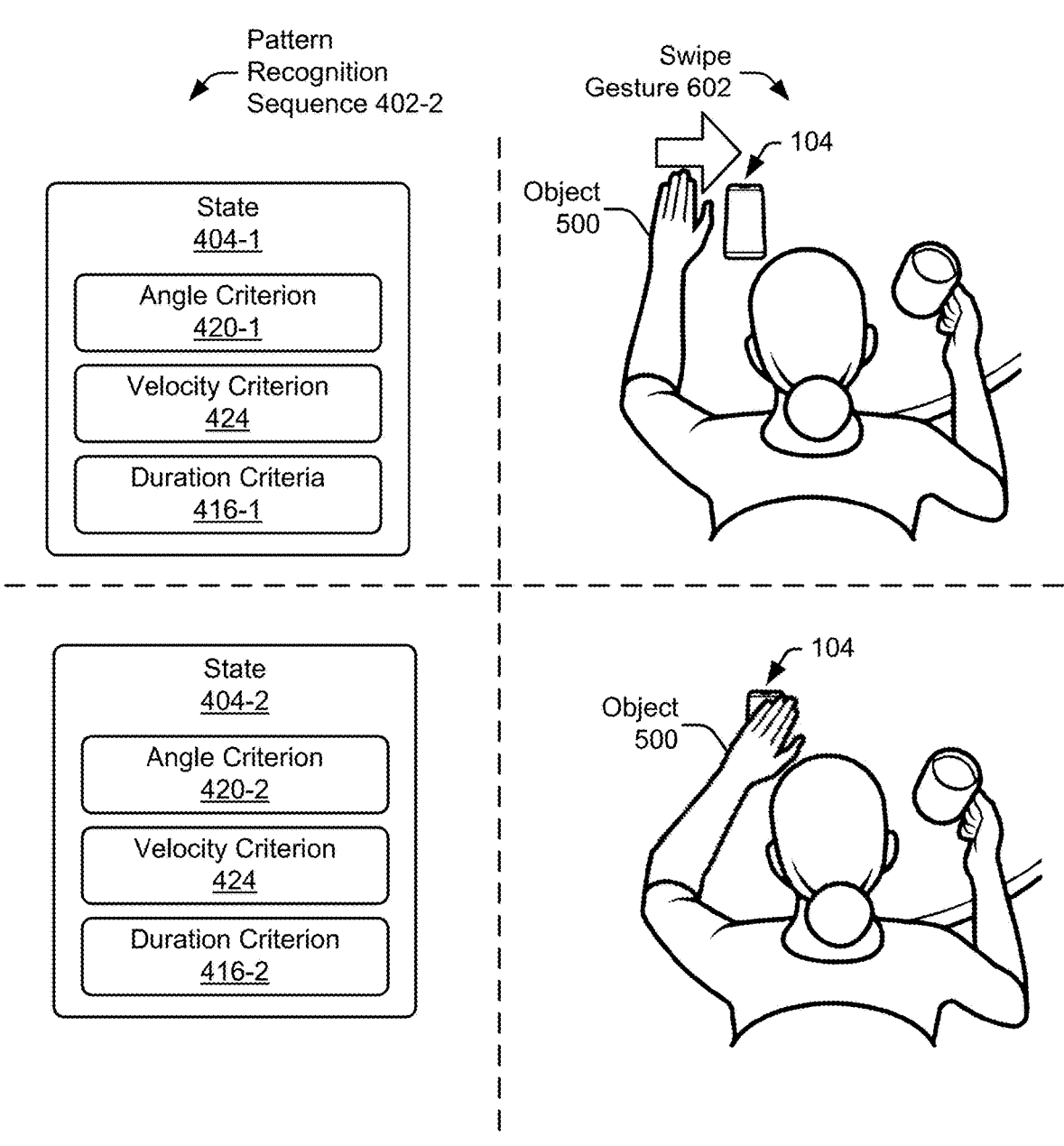
Figures 2, 6:
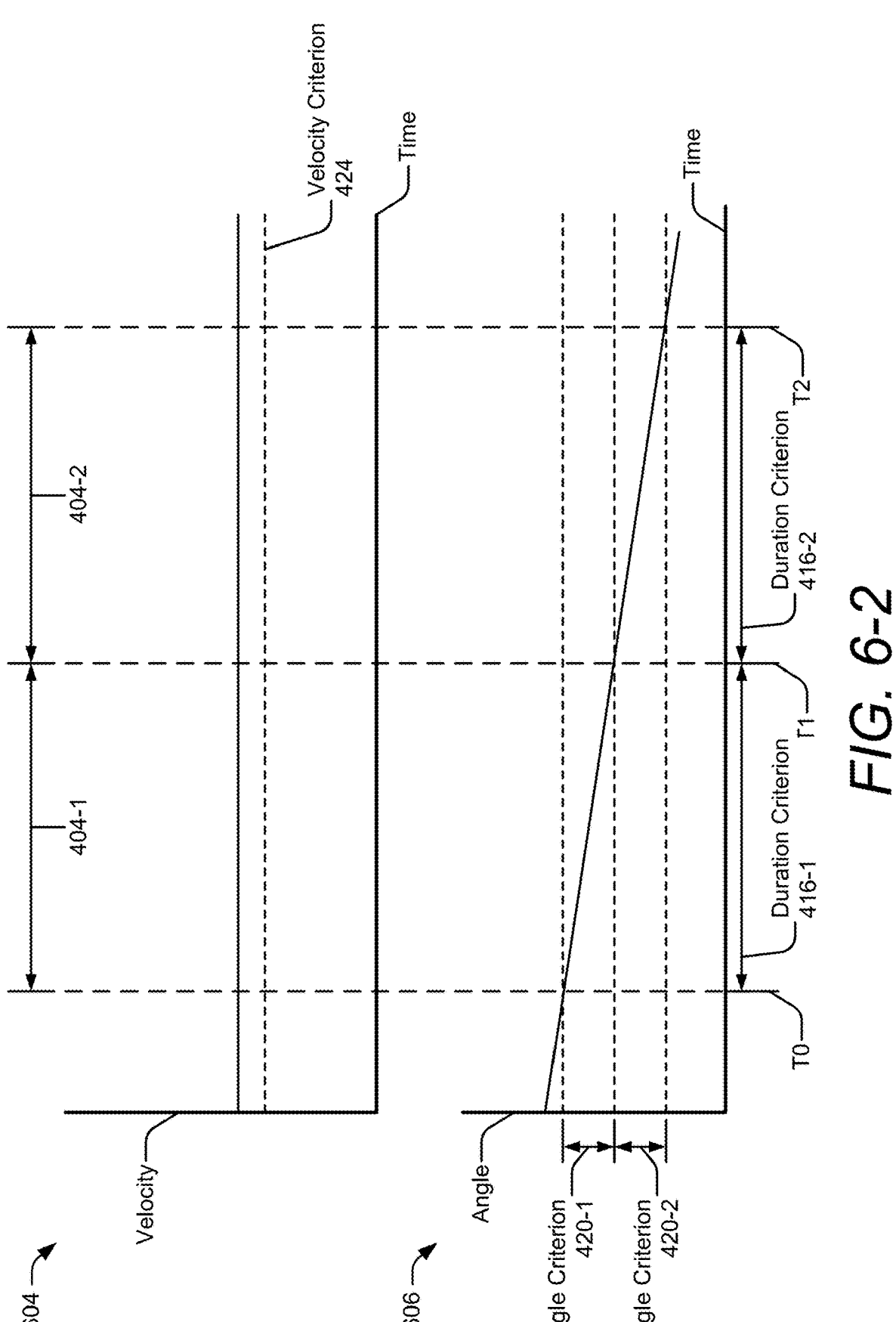

FIG. 6-1 illustrates an example pattern recognition sequence 402-2 associated with the object 500 performing a swipe gesture 602. To perform the swipe gesture 602, the object 500 moves across the smart device 104 along a relatively straight path. The straight path can be oriented along any direction for an omni-swipe gesture. Alternatively, the straight path can be oriented along a particular direction associated with a direction-specific swipe gesture (e.g., a top-to-bottom direction, a bottom-to-top direction, a left-to-right direction, or a right-to-left direction). In FIG. 6-1, the object 500 is shown to be a person's hand. However, other types of objects, including inanimate objects, can alternatively be used.

In this example, the pattern recognition sequence 402-2 includes states 404-1 and 404-2. The state 404-1 includes angle criterion 420-1, velocity criterion 424, and duration criterion 416-1, which characterize a behavior of the object 500 as it begins swiping across the smart device 104. The state 404-2 includes angle criterion 420-2, velocity criterion 424, and duration criterion 416-2, which characterize a behavior of the object 500 as it continues swiping across the smart device 104.

The criteria 406 across the states 404-1 and 404-2 can be similar, such as in the case of the velocity criterion 424, or different, such as in the case of the angle criterion 420-1 and 420-2. The criteria 406 associated with the states 404-1 and 404-2 are further described with respect to FIG. 6-2.

FIG. 6-2 illustrates example behavior of the object 500 performing the swipe gesture 602. A graph 604 depicts a velocity of the object 500 over a duration of the swipe gesture 602. The velocity can be determined based on a change in a measured position of the object 500. In this case, the velocity remains relatively constant. A graph 606 depicts an angle of the object 500 over a duration of the swipe gesture 602. In this case, the angle changes over time, which is a characteristic of the swipe gesture 602. For this example, consider that the criteria 406 of the states 404-1 and 404-2 represent exit criteria.

Between time T0 and T1, the velocity of the object 500 is above a threshold specified by the velocity criteria 424 of the state 404-1. Also, the angle of the object 500 changes by an amount specified by the angle criterion 420-1. The object 500 satisfies the velocity criterion 424 and the angle criterion 420-1 for a duration specified by the duration criterion 416-1. As such, a first portion of the swipe gesture 602 is characterized by the state 404-1.

Between time T1 and T2, the velocity of the object 500 remains above the threshold specified by the velocity criterion 424. Also, the angle of the object 500 changes by an amount specified by the angle criterion 420-2. The object 500 satisfies the velocity criterion 424 and the angle criterion 420-1 for a duration specified by the duration criterion 416-2. As such, a second portion of the swipe gesture 602 is characterized by the state 404-2.

By recognizing objects that satisfy the criteria of states 404-1 and 404-2 in sequence, the radar system 102 can recognize the swipe gesture 602, and the radar application programming interface 210 can send a response 320 to the application 206 indicating that the swipe gesture 602 occurred. The application 206 can perform an action responsive to receiving the response 320. For example, the application 206 can scroll through content or play a next song in a playlist.

Other implementations of the pattern recognition sequence 402-2 can include angle criterion 420 that supports a swipe gesture 602 along a particular direction. To recognize a swipe gesture 602 from left-to-right, the angle criterion 420-1 of the state 404-1 can identify if the object 500 appears on a left side of the smart device 104. Also, the angle criterion 420-2 of the state 404-2 can identify if the object 500 travels to a right side of the smart device 104.

Some applications 206 may add additional criterion 406 within one or more of the states 404-1 and 404-2 or tighten tolerances of the criteria 406 to reduce false-positives. For example, the application 206 can add the material composition criterion 428 to the states 404-1 and 404-2 to distinguish between a swipe gesture 602 performed by a user and the user moving an inanimate object (e.g., a cup or paper) across the smart device 104.

Figures 1, 7:
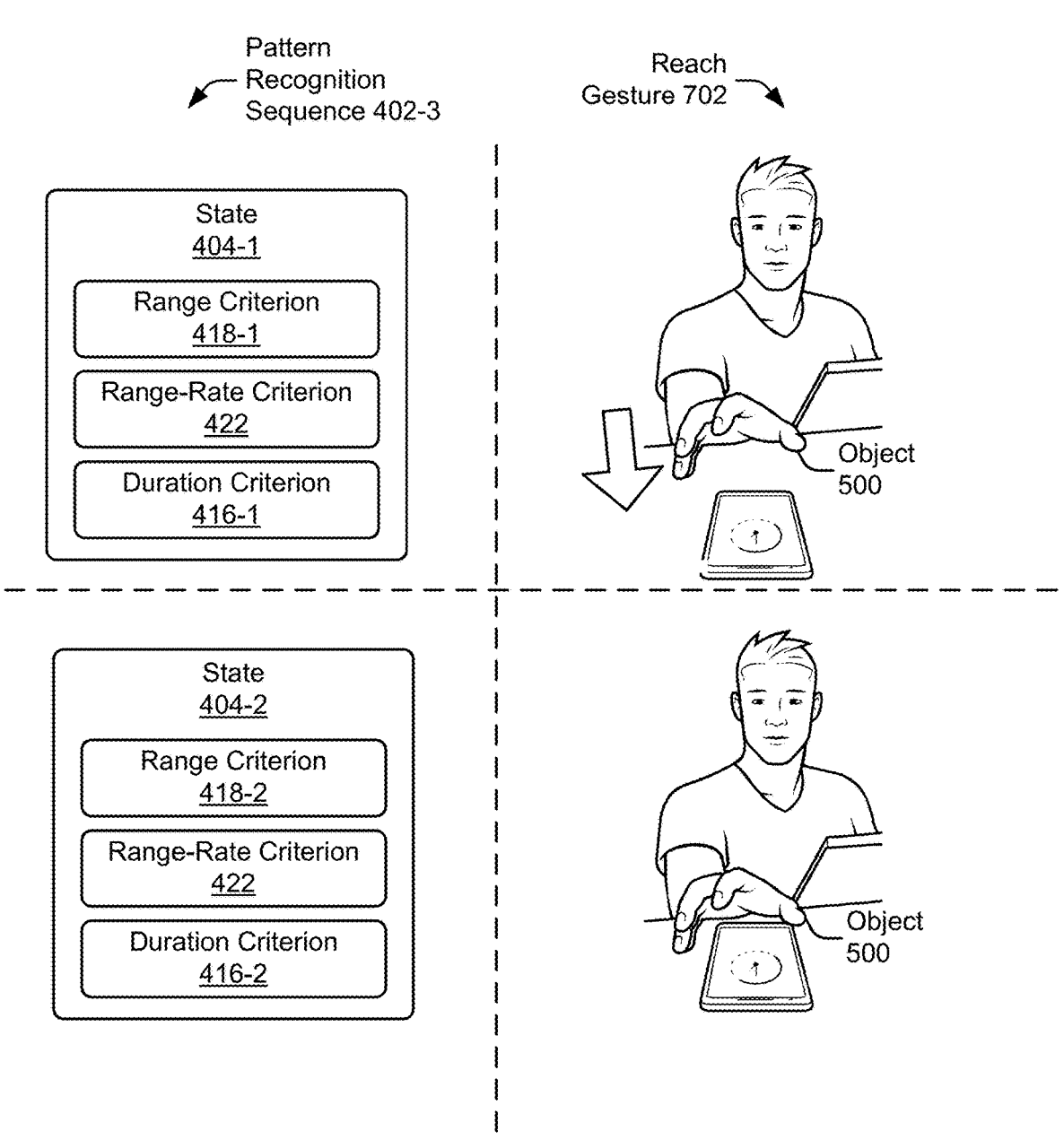
Figures 2, 7:
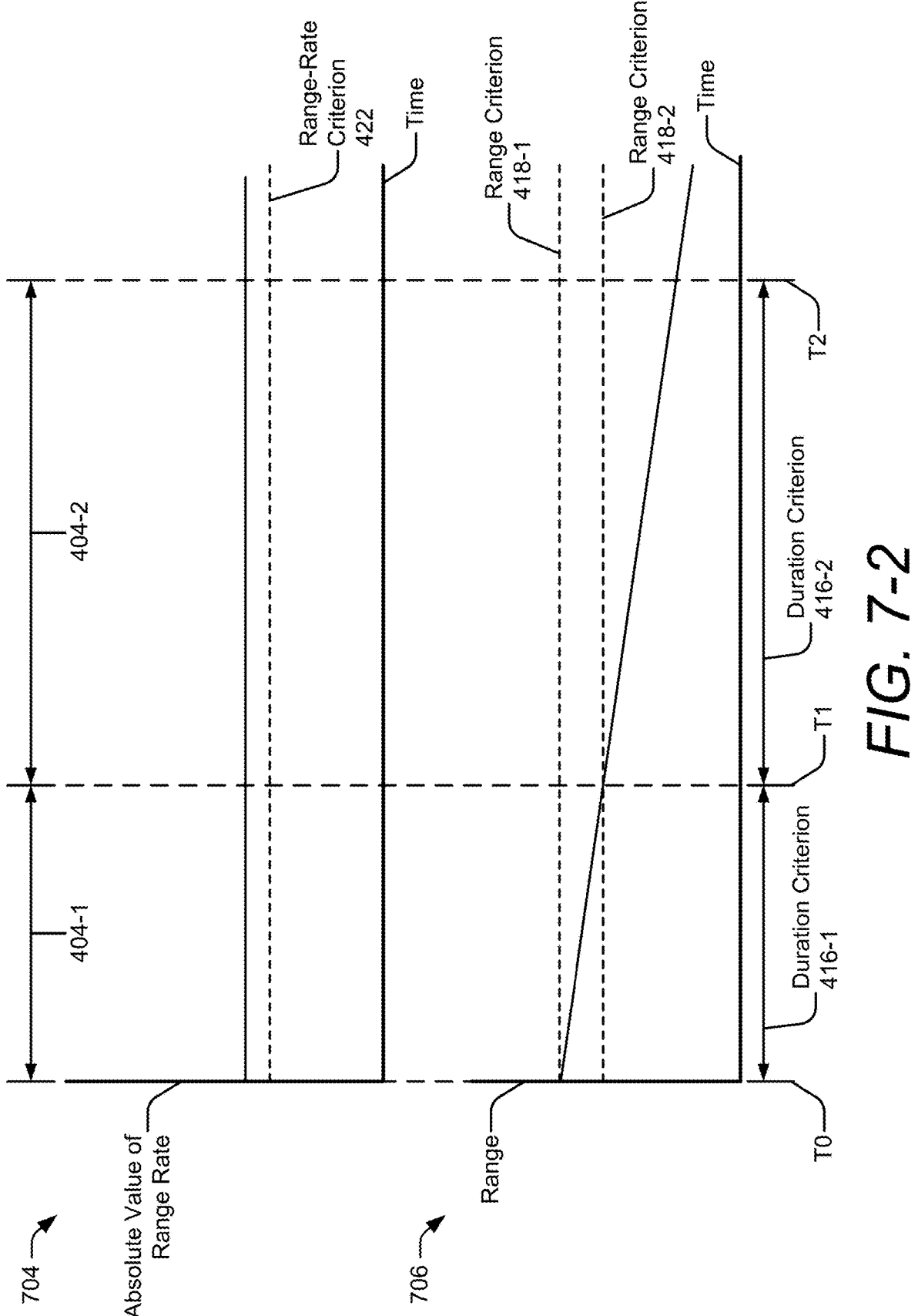

FIG. 7-1 illustrates an example pattern recognition sequence 402-3 associated with the object 500 performing a reach gesture 702. To perform the reach gesture 702, the object 500 moves towards the smart device 104 along a relatively straight path. In this example, the pattern recognition sequence 402-3 includes states 404-1 and 404-2. The state 404-1 includes range criterion 418-1, range-rate criterion 422, and duration criterion 416-1, which characterize a behavior of the object 500 as it begins reaching towards the smart device 104. The state 404-2 includes range criterion 418-2, range-rate criterion 422, and duration criterion 416-2, which characterize a behavior of the object 500 as it continues reaching towards the smart device 104.

The criteria 406 across the states 404-1 and 404-2 can be similar, such as in the case of the range-rate criterion 422, or different, such as in the case of the range criterion 418-1 and 418-2. The criteria 406 associated with the states 404-1 and 404-2 are further described with respect to FIG. 7-2.

FIG. 7-2 illustrates example behavior of the object 500 performing the reach gesture 702. A graph 704 depicts an absolute value of a range rate of the object 500 over a duration of the reach gesture 702. The range rate can be determined based on a measured Doppler frequency or changes in a measured range (e.g., distance) of the object 500. In this case, the range rate remains relatively constant. A graph 706 depicts a range (e.g., distance) of the object 500 over a duration of the reach gesture 702. In this case, the range decreases over time, which is a characteristic of the reach gesture 702. For this example, consider that the criteria of the states 404-1 and 404-2 represent exit criteria.

Between time T0 and T1, an absolute value of the range rate of the object 500 is above a threshold specified by the range-rate criterion 422 of the state 404-1. Also, the range of the object 500 is less than the range criterion 418-1. The object 500 satisfies the range-rate criterion 422 and the range criterion 418-1 for a duration specified by the duration criterion 416-1. As such, a first portion of the reach gesture 702 is characterized by the state 404-1.

Between time T1 and T2, an absolute value of the range rate of the object 500 is above the threshold specified by the range-rate criterion 422. Also, the range of the object 500 is less than the range criterion 418-2. The object 500 satisfies the range-rate criterion 422 and the range criterion 418-2 for a duration specified by the duration criterion 416-2. As such, a second portion of the reach gesture 702 is characterized by the state 404-2.

By recognizing objects that satisfy the criteria 406 of states 404-1 and 404-2 in sequence, the radar system 102 can recognize the reach gesture 702, and the radar application programming interface 210 can send a response 320 to the application 206 indicating that the reach gesture 702 occurred. The application 206 can perform an action responsive to receiving the response 320. For example, the application 206 can activate a sensor, initiate facial authentication, or turn on a display. Operations of the radar system 102 are further described with respect to FIGS. 8-10.

Figure 8:
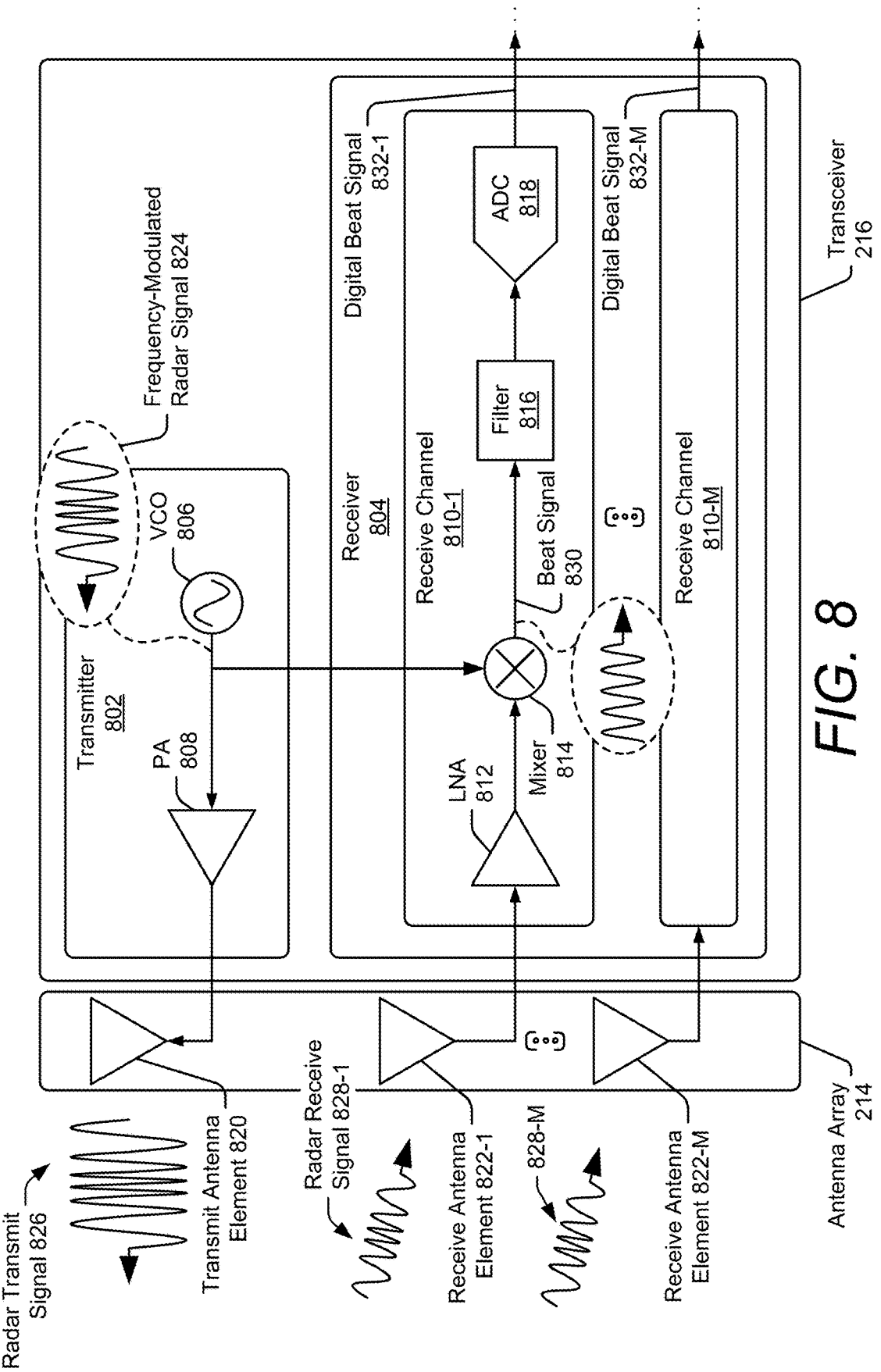
FIG. 8 illustrates an example antenna array and an example transceiver of a radar system.

FIG. 8 illustrates an example antenna array 214 and an example transceiver 216 of the radar system 102. In the depicted configuration, the transceiver 216 includes a transmitter 802 and a receiver 804. The transmitter 802 includes at least one voltage-controlled oscillator 806 and at least one power amplifier 808. The receiver 804 includes at least two receive channels 810-1 to 810-M, where M is a positive integer greater than one. Each receive channel 810-1 to 810-M includes at least one low-noise amplifier 812, at least one mixer 814, at least one filter 816, and at least one analog-to-digital converter 818. The antenna array 214 includes at least one transmit antenna element 820 and at least two receive antenna elements 822-1 to 822-M. The transmit antenna element 820 is coupled to the transmitter 802. The receive antenna elements 822-1 to 822-M are respectively coupled to the receive channels 810-1 to 810-M. Other implementations of the radar system 102 can include multiple transmit antenna elements 820 and/or a single receive antenna element 822.

During transmission, the voltage-controlled oscillator 806 generates a frequency-modulated radar signal 824 at radio frequencies. The power amplifier 808 amplifies the frequency-modulated radar signal 824 for transmission via the transmit antenna element 820. The transmitted frequency-modulated radar signal 824 is represented by radar transmit signal 826, which can include multiple chirps. As an example, the radar transmit signal 826 includes 16 chirps, which can be transmitted in a continuous burst or as time-separated pulses. A duration of each chirp can be on the order of tens or thousands of microseconds (e.g., between approximately 30 microseconds (μs) and 5 milliseconds (ms)), for instance.

Individual frequencies of the chirps can increase or decrease over time. The radar system 102 can employ a two-slope cycle (e.g., triangular frequency modulation) to linearly increase and linearly decrease the frequencies of the chirps over time. The two-slope cycle enables the radar system 102 to measure the Doppler frequency shift caused by motion of the object 500. In general, transmission characteristics of the chirps (e.g., bandwidth, center frequency, duration, and transmit power) can be tailored to achieve a particular detection range, range resolution, or Doppler sensitivity for detecting one or more characteristics the object 500. In some cases, the characteristics of the chirps are tailored by the application 206 using the radar application programming interface 210. For example, the application-programming-interface engine 226 can optionally configure the transmitter 802 to generate a particular type of radar signal according to the radar application programming interface 210.

During reception, each receive antenna element 822-1 to 822-M receives a radar receive signal 828-1 to 828-M, which represent a delayed version of the radar transmit signal 826. The amount of delay is proportional to a distance between the antenna array 214 of the radar system 102 and the object 500. In particular, this delay represents a summation of a time it takes for the radar transmit signal 826 to propagate from the radar system 102 to the object 500 and a time it takes for the radar receive signal 828-1 to 828-M to propagate from the object 500 to the radar system 102. In general, relative phase differences between the radar receive signals 828-1 to 828-M are due to differences in locations of the receive antenna elements 822-1 to 822-M. If the object 500 is moving, the radar receive signals 828-1 to 828-M are shifted in frequency relative to the radar transmit signal 826 due to the Doppler effect. Similar to the radar transmit signal 826, the radar receive signals 828- to 828-M are composed of one or more of the chirps.

Within each receive channel 810-1 to 810-M, the low-noise amplifier 812 amplifies the radar receive signal 828, and the mixer 814 mixes the amplified radar receive signal 828 with the frequency-modulated radar signal 824. In particular, the mixer performs a beating operation, which downconverts and demodulates the radar receive signal 828 to generate a beat signal 830.

A frequency of the beat signal 830 represents a frequency difference between the frequency-modulated radar signal 824 and the radar receive signal 828, which is proportional to a slant range. Although not shown, the beat signal 830 can include multiple frequencies, which represents reflections from different objects or portions of an object within the external environment. In some cases, these different objects move at different speeds, move in different directions, or are positioned at different slant ranges relative to the radar system 102.

The filter 816 filters the beat signal 830, and the analog-to-digital converter 818 digitizes the filtered beat signal 830. The receive channels 810-1 to 810-M respectively generate digital beat signals 832-1 to 832-M, which are provided to the system processor 218 for processing. The receive channels 810-1 to 810-M of the transceiver 216 are coupled to the system processor 218, as shown in FIG. 9.

Figure 9:
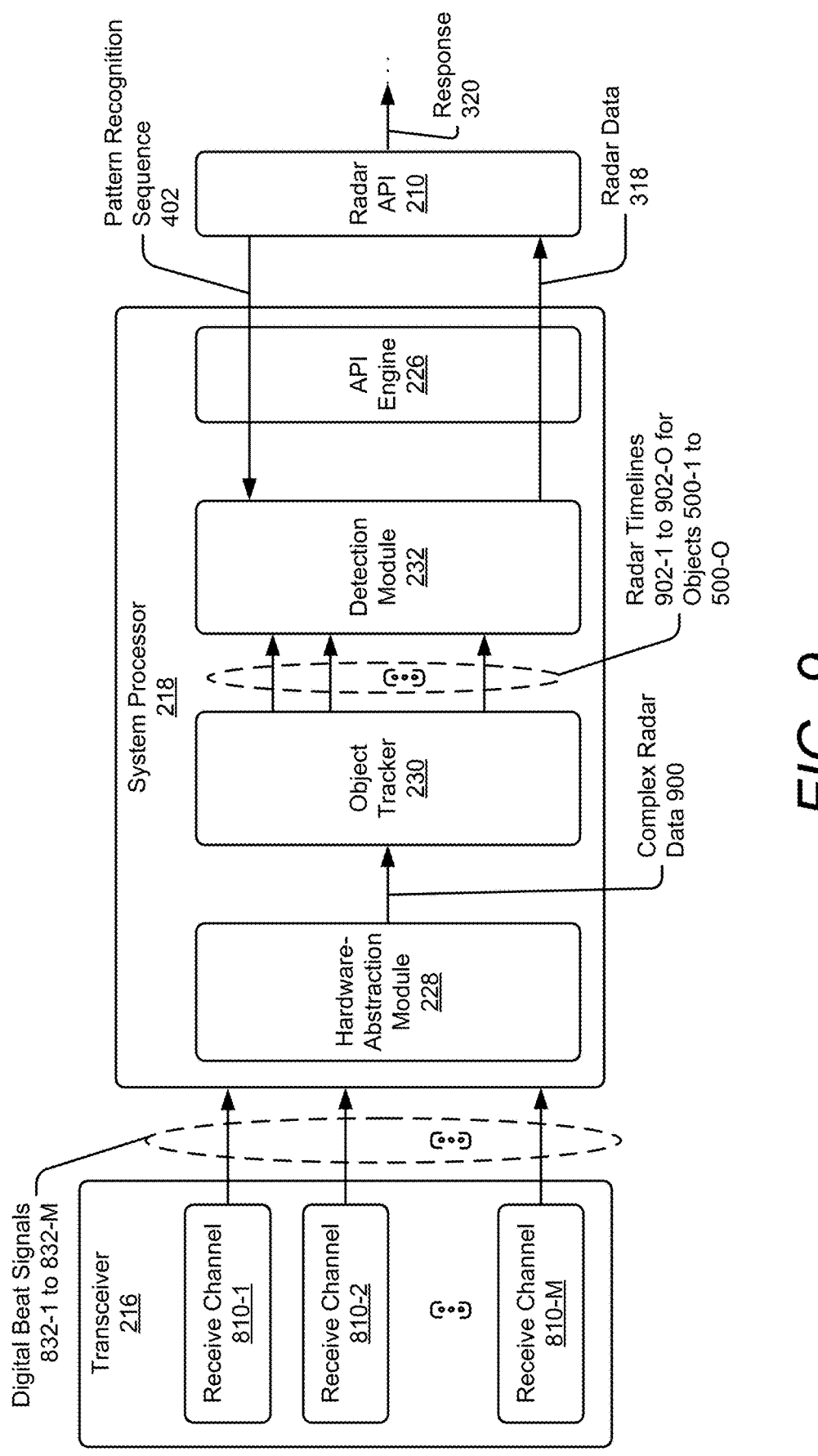
FIG. 9 illustrates example operations of a hardware-abstraction module, an object tracker, a detection module, a radar application programming engine, and a radar application programming interface.

FIG. 9 illustrates example operations of the hardware-abstraction module 228, the object tracker 230, the detection module 232, the application-programming-interface engine 226, and the radar application programming interface 210. The system processor 218 is connected to the receive channels 810-1 to 810-M and can also communicate with the radar application programming interface 210. In the depicted configuration, the system processor 218 implements the hardware-abstraction module 228, the object tracker 230, the detection module 232, and the application-programming-interface engine 226. Although not shown, the hardware-abstraction module 228, the object tracker 230, the detection module 232, and/or the application-programming-interface engine 226 can alternatively be implemented by the computer processor 202.

In some implementations, the application-programming-interface engine 226 can handle communication between the system processor 218 and the radar application programming interface 210. For example, the application-programming-interface engine 226 can accept the pattern recognition sequence 402 from the radar application programming interface 210 and pass the pattern recognition sequence 402 to the detection module 232 or configure the detection module 232 according to the pattern recognition sequence 402. The application-programming-interface engine 226 can also pass the radar data 318 from the detection module 232 to the radar application programming interface 210. In some cases, the application-programming-interface engine 226 formats the radar data 318 in a manner specified by the radar application programming interface 210. In other implementations, the radar application programming interface 210 and the detection module 232 can communicate without interfacing via the application-programming-interface engine 226. In this case, the radar application programming interface 210 passes the pattern recognition sequence 402 to the detection module 232, and the detection module 232 passes the radar data 318 to the radar application programming interface 210.

In this example, the hardware-abstraction module 228 accepts the digital beat signals 832-1 to 832-M from the receive channels 810-1 to 810-M. The digital beat signals 832-1 to 832-M represent raw or unprocessed complex data. The hardware-abstraction module 228 performs one or more operations to generate complex radar data 900 based on the digital beat signals 832-1 to 832-M. The complex radar data 900 includes both magnitude and phase information (e.g., in-phase and quadrature components). In some implementations, the complex radar data 900 includes information representative of range-Doppler maps for each receive channel 810-1 to 810-M. In other implementations the complex radar data 900 includes angular information. The angular information can be implicit within the complex radar data 900, such as within the multiple range-Doppler maps. Alternatively, the system processor 218 or object tracker 230 performs digital beamforming to explicitly provide the angular information, such as in the form of information representative of a four-dimensional range-Doppler-azimuth-elevation map. Other forms of the complex radar data 900 are also possible. For example, the complex radar data 900 can include complex interferometry data for each receive channel 810-1 to 810-M. The complex interferometry data is an orthogonal representation of the range-Doppler map. In yet another example, the complex radar data 900 includes frequency-domain representations of the digital beat signals 832-1 to 832-M for an active radar frame. Sometimes the complex radar data 900 can include a combination of any of the above examples. For instance, the complex radar data 900 can include magnitude information associated with the range-Doppler maps and complex interferometry data. Although not shown, other implementations of the radar system 102 can provide the digital beat signals 832-1 to 832-M directly to the application-programming-interface engine 226.

The object tracker 230 analyzes the complex radar data 900 and identifies individual objects within the complex radar data 900. Over time, the object tracker 230 compiles information about these objects, including position information, motion information, physical characteristic information, or some combination thereof. In this example, the object tracker 230 generates radar timelines 902-1 to 902-0 for objects 500-1 to 500-O, where O represents a positive integer. In some cases, the object tracker 230 generates a single radar timeline 902 associated with a closest moving object 500. This can speed up execution of the application-programming-interface engine 226.

The detection module 232 accepts the radar timelines 902-1 to 902-O from the object tracker 230, and accepts the pattern recognition sequence 402 from the radar application programming interface 210. The detection module 232 recognizes the pattern recognition sequence 402 within at least one of the radar timelines 902-1 to 902-0 and sends the radar data 318 to the radar application programming interface 210. Based on the radar data 318, the radar application programming interface 210 generates the response 320, which is provided to the application 206. The operation of the detection module 232 is further described with respect to FIG. 10.

Figure 10:
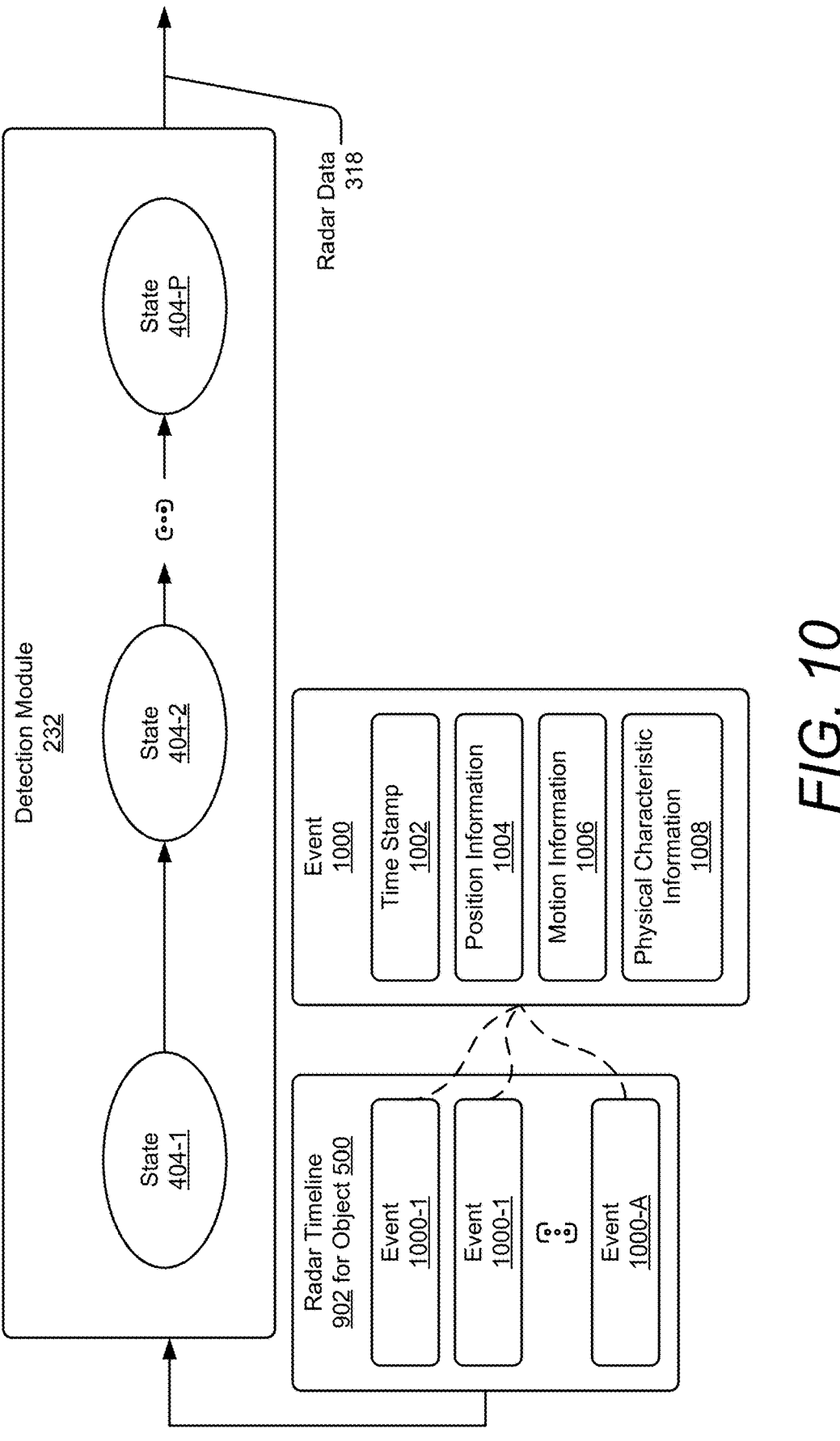
FIG. 10 illustrates an example scheme implemented by a detection module.

FIG. 10 illustrates an example scheme implemented by the detection module 232. For gesture recognition, the detection module 232 implements a state machine based on the states 404-1 to 404-P specified by the pattern recognition sequence 402. The detection module 232 accepts a radar timeline 902 associated with the object 500. The radar timeline 902 includes a list of events 1000-1 to 1000-A, where A represents a positive integer. Each event 1000 can include a time stamp 1002, position information 1004, motion information 1006, physical characteristic information 1008, or some combination thereof. The position information 1004, motion information 1006, and physical characteristic information 1008 can be based on measured data, smoothed data, and/or predicted data.

The detection module 232 transitions through the states 404-1 to 404-P as the criteria 406 for each state is satisfied by the radar timeline 902. Responsive to completing state 404-P, the detection module 232 sends the radar data 318 to the radar application programming interface 210, to cause the radar application programming interface 210 to send the response 320 to the application 206. This process can be performed for multiple radar timelines 902-1 to 902-0. In some cases, these operations can be performed in parallel as the object tracker 230 compiles the radar timelines 902-1 to 902-O.

In some situations, other motions that are not associated with the gesture can be observed by the radar system 102. These other motions can include vacuuming, walking, walking a dog, folding clothes, making a bed, and/or repositioning an object. If these other motions are observed by the radar system 102, the detection module 232 can determine that these other motions are not associated with the gesture based on the pattern recognition sequence 402. Consider that the states 404-1 to 404-P are defined in such a way as to distinguish between the gesture and these other motions. In particular, the states 404-1 to 404-P describe one or more features of the gesture that differ from the other motions. As the other motions occur, the detection module 232 determines that the criteria 406 for at least one of the states 404-1 to 404-P is not satisfied. In this way, the radar system 102 determines that the other motions are not associated with the gesture. The radar system 102 does not necessarily have to differentiate between or identify each of these other motions. Optionally, some radar systems 102 can utilize additional pattern recognition sequences 404 that describe the features of these other motions. In this way, the radar system 102 can explicitly recognize one or more of these other motions.

Sometimes, the radar system 102 can operate according to multiple modes or support multiple applications 206 during a same time interval. In this case, the system processor 218 can execute multiple instances of the detection module 232 that can run in parallel. In this case, each instance of the detection module 232 can be configured by a corresponding application 206 using the radar application programming interface 210. For example, one instance of the detection module 232 can be configured for gesture recognition by a first application 206, and another instance of the detection module 232 can be configured for health monitoring by a second application 206. Also, a third instance of the detection module 232 can be configured differently for gesture recognition by a third application 206.

Example Method

FIG. 11 depicts an example method 1100 performed by a radar system 102 using a radar application programming interface 210. Method 1100 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100-1 to 100-6 of FIG. 1, and entities detailed in FIG. 2-1, 2-2, 3-1, or 4, reference to which is made for example only. The techniques are not limited to performance by one entity or multiple entities operating on one device.

At 1102, a first request from an application of a smart device is accepted via a first layer of multiple layers of a radar application programming interface of the smart device.

The first request comprises a pattern recognition sequence that specifies a sequence of states associated with a gesture. The multiple layers of the radar application programming interface are associated with different operational levels of the radar system. For example, the radar system 102 accepts, via a first layer 310-1 of the radar application programming interface 210 of the smart device 104, a first request 314 from the application 206 of the smart device 104, as shown in FIG. 3-1. The first request 314 includes the pattern recognition sequence 402, which specifies a sequences of states 404-1 to 404-P associated with a gesture, as shown in FIG. 4. Example gestures can include the pump gesture 502, the swipe gesture 602, the reach gesture 702, or any of the gestures described above with respect to FIG. 1. The multiple layers 310 of the radar application programming interface 210 are associated with different operational levels 322 of the radar system 102, as shown in FIG. 3-2. The first layer 310-1 of the radar application programming interface 210 can correspond to the use case application programming interface 302

At 1104, a second request from the application of the smart device is accepted via a second layer of the multiple layers of the radar application programming interface. The second request comprises a detection range of the radar system for detecting the gesture. For example, the radar system 102 accepts, via the fourth layer 310-4 of the radar application programming interface 210, a second request 314 from the application 206. The second request 314 includes a detection range of the radar system 102 for detecting the gesture. The fourth layer 310-4 of the radar application programming interface 210 can correspond to the hardware-abstraction application programming interface 308.

At 1106, a hardware configuration of the radar system is modified based on the detection range. For example, the application-programming-interface engine 226 modifies the hardware configuration (e.g., the hardware 324) of the radar system 102 to achieve the specified detection range. In particular, the application-programming-interface engine 226 adjust the transmit power, the quantity of pulses, the quantity of active antenna elements within the antenna array 214, and/or the beamforming pattern of the radar system 102 to achieve the specified detection range. The hardware configuration can include one of the available configurations 312.

At 1108, a radar signal is transmitted and received using the hardware configuration. At least a portion of the radar signals reflect off an object that performs the gesture. For example, the radar system 102 transmits the radar transmit signal 826 and receives the radar receive signals 828-1 to 828-M, as shown in FIG. 8. At least a portion of the radar transmit signal 826 reflects off the object 500, which performs the gesture. The object 500 can include an appendage of a user or an inanimate object, such as a stylus.

At 1110, the gesture is recognized based on the pattern recognition sequence and the receive radar signal. For example, the radar system 102 recognizes the gesture based on the pattern recognition sequence 402 and the radar receive signals 828-1 to 828-M. In particular, the object tracker 230 compiles the radar timeline 902 of the object 500. The radar timeline 902 describes a behavior of the object 500 over time. This behavior can include position information 1004, motion information 1006, and/or physical characteristic information 1008. The detection module 232 recognizes the pattern recognition sequence 402 within the radar timeline 902 of the object 500. In particular, the detection module 232 implements a state machine and recognizes the pattern recognition sequence 402 responsive to the radar timeline 902 satisfying criteria 406 associated with states 404-1 to 404-P in sequence.

At 1112, a response is sent, via the radar application programming interface, to the application. The response indicates occurrence of the gesture. For example, the radar application programming interface 210 sends the response 320 to the application 206 indicating occurrence of the gesture.

Example Computing System

Figure 12:
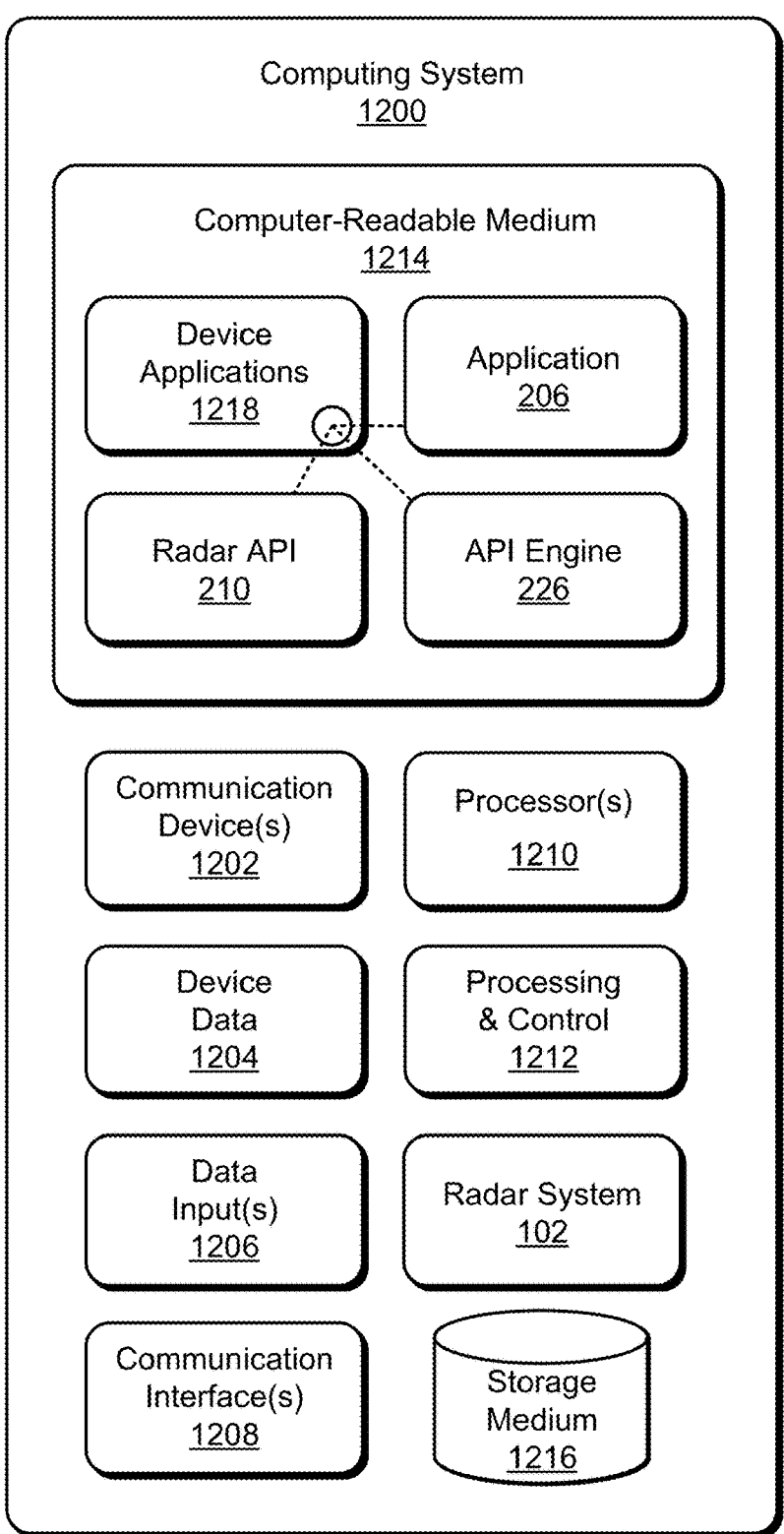
FIG. 12 illustrates an example computing system embodying, or in which techniques may be implemented that enable use of, a radar application programming interface.

FIG. 12 illustrates various components of an example computing system 1200 that can be implemented as any type of client, server, and/or computing device as described with reference to the previous FIGS. 2-1 and 2-2 to implement a radar application programming interface 210.

The computing system 1200 includes communication devices 1202 that enable wired and/or wireless communication of device data 1204 (e.g., received data, data that is being received, data scheduled for broadcast, or data packets of the data). The communication devices 1202 or the computing system 1200 can include one or more radar systems 102. The device data 1204 or other device content can include configuration settings of the device, media content stored on the device, and/or information associated with a user of the device. Media content stored on the computing system 1200 can include any type of audio, video, and/or image data. The computing system 1200 includes one or more data inputs 1206 via which any type of data, media content, and/or inputs can be received, such as human utterances, user-selectable inputs (explicit or implicit), messages, music, television media content, recorded video content, and any other type of audio, video, and/or image data received from any content and/or data source.

The computing system 1200 also includes communication interfaces 1208, which can be implemented as any one or more of a serial and/or parallel interface, a wireless interface, any type of network interface, a modem, and as any other type of communication interface. The communication interfaces 1208 provide a connection and/or communication links between the computing system 1200 and a communication network by which other electronic, computing, and communication devices communicate data with the computing system 1200.

The computing system 1200 includes one or more processors 1210 (e.g., any of microprocessors, controllers, and the like), which process various computer-executable instructions to control the operation of the computing system 1200. Alternatively or in addition, the computing system 1200 can be implemented with any one or combination of hardware, firmware, or fixed logic circuitry that is implemented in connection with processing and control circuits which are generally identified at 1212. Although not shown, the computing system 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1200 also includes a computer-readable medium 1214, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 1200 can also include a mass storage medium device (storage medium) 1216.

The computer-readable medium 1214 provides data storage mechanisms to store the device data 1204, as well as various device applications 1218 and any other types of information and/or data related to operational aspects of the computing system 1200. For example, an operating system 1220 can be maintained as a computer application with the computer-readable medium 1214 and executed on the processors 1210. The device applications 1218 may include a device manager, such as any form of a control application, software application, signal-processing and control module, code that is native to a particular device, a hardware abstraction layer for a particular device, and so on.

The device applications 1218 also include any system components, engines, or managers to implement a radar application programming interface 210. In this example, the device applications 1218 includes the application 206, the radar application programming interface 210, and the application-programming-interface engine 226 of FIG. 2-2.

CONCLUSION

Although techniques using, and apparatuses including, a radar application programming interface have been described in language specific to features and/or methods, it is to be understood that the subject of the appended claims is not necessarily limited to the specific features or methods described. Rather, the specific features and methods are disclosed as example implementations of a radar application programming interface.

Some examples are provided below.

Example 1: A method performed by a radar system of a smart device, the method comprising:

accepting, via a first layer of multiple layers of a radar application programming interface of the smart device, a first request from an application of the smart device, the first request comprising a pattern recognition sequence that specifies a sequence of states associated with a gesture, the multiple layers of the radar application programming interface associated with different operational levels of the radar system;

accepting, via a second layer of the multiple layers of the radar application programming interface, a second request from the application of the smart device, the second request comprising a detection range of the radar system for detecting the gesture;

modifying a hardware configuration of the radar system based on the detection range;

transmitting and receiving a radar signal using the hardware configuration, at least a portion of the radar signal reflecting off an object that moves;

recognizing the gesture based on the pattern recognition sequence and the received radar signal; and responsive to the recognizing, sending, via the radar application programming interface, a response to the application indicating occurrence of the gesture.

Example 2: The method of example 1, wherein:

the different operational levels of the radar system comprise:

a first operational level associated with a radar-data-processing module of the radar system; and a second operational level associated with operation of a transceiver of the radar system;

the first layer of the multiple layers of the radar application programming interface is associated with the first operational level; and the second layer of the multiple layers of the radar application programming interface is associated with the second operational level.

Example 3: The method of example 1, further comprising:

accepting, via a third layer of the multiple layers of the radar application programming interface, a third request from the application of the smart device, the third request comprising an implementation chain specifying a sequence of modules associated with digital signal processing or data processing; and modifying a software configuration of the radar system based on the implementation chain.

Example 4: The method of any previous example, wherein:

the sequence of states comprises at least two states, the at least two states comprising:

a beginning state that describes at least one starting feature of the gesture; and an end state that describes at least one ending feature of the gesture; and the at least one starting feature and the at least one ending feature each describe a characteristic of the object performing the gesture that can be determined using radar sensing.

Example 5: The method of any previous example, wherein:

each state within the sequence of states comprises at least one criterion associated with the gesture;

the sequence of states comprises a first state;

the first state comprises a first criterion; and the first criterion comprises at least one of the following:

an entrance criterion for entering the first state; or an exit criterion for exiting the first state.

Example 6: The method of example 5, wherein the entrance criterion or the exit criterion comprises at least one of the following:

a position criterion;

a motion criterion;

a signal characteristic criterion; or a duration criterion.

Example 7: The method of any previous example, wherein the recognizing of the gesture comprises:

compiling a radar timeline of the object based on the received radar signal, the radar timeline describing a behavior of the object over time; and detecting the pattern recognition sequence within the radar timeline.

Example 8: The method of example 7, wherein the radar timeline comprises multiple events, each event comprising at least one of the following:

a time stamp;

position information about the object;

motion information about the object; or physical characteristic information about the object.

Example 9: The method of example 7 or 8, wherein:

the gesture comprises a pump gesture; and the detecting the pattern recognition sequence comprises:

detecting, according to a first state of the sequence of states, the object moving towards the radar system along an angle with an absolute value of a range rate that is above a first threshold for a first duration;

detecting, according to a second state of the sequence of states, the object changing directions from moving towards the radar system to moving away from the radar system; and detecting, according to a third state of the sequence of states, the object moving away from the radar system along the angle with the absolute value of the range rate being above a second threshold for a second duration.

Example 10: The method of example 7 or 8, wherein:

the gesture comprises a swipe gesture; and the detecting the pattern recognition sequence comprises:

detecting, according to a first state of the sequence of states, the object changing angles with a velocity that is above a threshold for a first duration; and detecting, according to a second state of the sequence of states, the object changing the angles along a same direction as the first state with the velocity that is above the threshold for a second duration.

Example 11: The method of example 10, wherein:

the swipe gesture comprises a directional swipe gesture; and the detecting the object changing the angles further comprises detecting the object changing the angles along a direction associated with the directional swipe gesture.

Example 12: The method of example 7 or 8, wherein:

the gesture comprises a reach gesture; and the detecting the pattern recognition sequence comprises:

detecting, according to a first state of the sequence of states, the object moving towards the radar system and having a range that is less than a first threshold for a first duration; and detecting, according to a second state of the sequence of states, the object moving towards the radar system and having the range that is less than a second threshold for a second duration.

Example 13: The method of any preceding example, wherein:

the object performs other motions in addition to the gesture; and the method comprises determining that the other motions are not associated with the gesture based on the pattern recognition sequence.

Example 14: The method of example 13, wherein the other motions are associated with at least one of the following:

a person vacuuming;

the person walking with the smart device;

the person walking a dog next to the smart device;

the person folding clothes next to the smart device;

the person making a bed next to the smart device; or the person repositioning an object that is proximate to the smart device.

Example 15: The method of any preceding example, wherein:

modifying the hardware configuration includes adjusting the transmit power, adjusting the quantity of pulses, adjusting the quantity of active antenna elements within the antenna array, and/or adjusting the beamforming pattern of the radar system to achieve the specified detection range.

Example 16: An apparatus comprising:

a radar system configured to perform any one of the methods of examples 1-15.

Example 17: A computer-readable storage medium comprising instructions that, responsive to execution by a processor, cause the radar system to perform any one of the methods of examples 1-15.

The invention claimed is:

1. A method performed by a radar system of a smart device, the method comprising:

accepting, via a first layer of multiple layers of a radar application programming interface of the smart device, a first request from an application of the smart device, the first request comprising a pattern recognition sequence that specifies a sequence of states associated with a gesture that is to be recognized using the radar system, the multiple layers of the radar application programming interface associated with different operational levels of the radar system;

accepting, via a second layer of the multiple layers of the radar application programming interface, a second request from the application of the smart device, the second request comprising a detection range of the radar system for detecting the gesture;

modifying a hardware configuration of the radar system based on the detection range provided via the second request from the application of the smart device, the modifying of the hardware configuration enabling the radar system to detect the gesture within the detection range;

transmitting and receiving a radar signal using the hardware configuration, at least a portion of the radar signal reflecting off an object that performs the gesture;

recognizing the gesture based on the received radar signal and the pattern recognition sequence provided via the first request from the application of the smart device; and responsive to the recognizing, sending, via the radar application programming interface, a response to the application indicating occurrence of the gesture.

2. The method of claim 1, wherein:

the different operational levels of the radar system comprise:

a first operational level associated with a radar-data-processing module of the radar system; and a second operational level associated with a transceiver of the radar system;

the first layer of the multiple layers of the radar application programming interface is associated with the first operational level; and the second layer of the multiple layers of the radar application programming interface is associated with the second operational level.

3. The method of claim 1, further comprising:

accepting, via a third layer of the multiple layers of the radar application programming interface, a third request from the application of the smart device, the third request comprising an implementation chain specifying a sequence of modules associated with digital signal processing or data processing; and modifying a software configuration of the radar system based on the implementation chain.

4. The method of claim 1, wherein:

the sequence of states comprises at least two states, the at least two states comprising:

a beginning state that describes at least one starting feature of the gesture; and an end state that describes at least one ending feature of the gesture; and the at least one starting feature and the at least one ending feature each describe a characteristic of the object performing the gesture that can be determined using radar sensing.

5. The method of claim 1, wherein:

each state within the sequence of states comprises at least one criterion associated with the gesture;

the sequence of states comprises a first state;

the first state comprises a first criterion; and the first criterion comprises at least one of the following:

an entrance criterion for entering the first state; or an exit criterion for exiting the first state.

6. The method of claim 5, wherein the entrance criterion or the exit criterion comprises at least one of the following:

a position criterion;

a motion criterion;

a signal characteristic criterion; or a duration criterion.

7. The method of claim 1, wherein the recognizing of the gesture comprises:

compiling a radar timeline of the object based on the received radar signal, the radar timeline describing a behavior of the object over time; and detecting the pattern recognition sequence within the radar timeline.

8. The method of claim 7, wherein the radar timeline comprises multiple events, each event comprising at least one of the following:

a time stamp;

position information about the object;

motion information about the object; or physical characteristic information about the object.

9. The method of claim 7, wherein:

the gesture comprises a pump gesture; and the detecting the pattern recognition sequence comprises:

detecting, according to a first state of the sequence of states, the object moving towards the radar system along an angle with an absolute value of a range rate that is above a first threshold for a first duration;

detecting, according to a second state of the sequence of states, the object changing directions from moving towards the radar system to moving away from the radar system; and detecting, according to a third state of the sequence of states, the object moving away from the radar system along the angle with the absolute value of the range rate being above a second threshold for a second duration.

10. The method of claim 7, wherein:

the gesture comprises a swipe gesture; and the detecting the pattern recognition sequence comprises:

detecting, according to a first state of the sequence of states, the object changing angles with a velocity that is above a threshold for a first duration; and detecting, according to a second state of the sequence of states, the object changing the angles along a same direction as the first state with the velocity that is above the threshold for a second duration.

11. The method of claim 10, wherein:

the swipe gesture comprises a directional swipe gesture; and the detecting the object changing the angles further comprises detecting the object changing the angles along a direction associated with the directional swipe gesture.

12. The method of claim 7, wherein:

the gesture comprises a reach gesture; and the detecting the pattern recognition sequence comprises:

detecting, according to a first state of the sequence of states, the object moving towards the radar system and having a range that is less than a first threshold for a first duration; and detecting, according to a second state of the sequence of states, the object moving towards the radar system and having the range that is less than a second threshold for a second duration.

13. The method of claim 1, wherein:

the object performs other motions in addition to the gesture; and the method comprises determining that the other motions are not associated with the gesture based on the pattern recognition sequence.

14. The method of claim 13, wherein the other motions are associated with at least one of the following:

a person vacuuming;

the person walking with the smart device;

the person walking a dog next to the smart device;

the person folding clothes next to the smart device;

the person making a bed next to the smart device; or the person repositioning an object that is proximate to the smart device.

15. The method of claim 1, wherein:

modifying the hardware configuration includes adjusting a transmit power, adjusting a quantity of pulses, adjusting a quantity of active antenna elements within an antenna array of the radar system, and/or adjusting a beamforming pattern of the radar system to achieve a specified detection range.

16. An apparatus comprising:

a radar system configured to:

accept, via a first layer of multiple layers of a radar application programming interface of the apparatus, a first request from an application of the apparatus, the first request comprising a pattern recognition sequence that specifies a sequence of states associated with a gesture that is to be recognized using the radar system, the multiple layers of the radar application programming interface associated with different operational levels of the radar system;

accept, via a second layer of the multiple layers of the radar application programming interface, a second request from the application of the apparatus, the second request comprising a detection range of the radar system for detecting the gesture;

modify a hardware configuration of the radar system based on the detection range provided via the second request from the application of the apparatus, the modified hardware configuration enabling the radar system to detect the gesture within the detection range; and transmit and receive a radar signal using the hardware configuration, at least a portion of the radar signal reflecting off an object that performs the gesture;

recognize the gesture based on the received radar signal and based on the pattern recognition sequence provided via the first request from the application of the apparatus; and responsive to the gesture being recognized, send, via the radar application programming interface, a response to the application indicating occurrence of the gesture.

17. A computer-readable storage medium comprising instructions that, responsive to execution by a processor, cause a radar system to:

accept, via a first layer of multiple layers of a radar application programming interface, a first request from an application, the first request comprising a pattern recognition sequence that specifies a sequence of states associated with a gesture that is to be recognized using the radar system, the multiple layers of the radar application programming interface associated with different operational levels of the radar system;

accept, via a second layer of the multiple layers of the radar application programming interface, a second request from the application, the second request comprising a detection range of the radar system for detecting the gesture;

modify a hardware configuration of the radar system based on the detection range provided via the second request from the application, the modified hardware configuration enabling the radar system to detect the gesture within the detection range;

transmit and receive a radar signal using the hardware configuration, at least a portion of the radar signal reflecting off an object that performs the gesture;

recognize the gesture based on the received radar signal and based on the pattern recognition sequence provided via the first request from the application; and responsive to the gesture being recognized, send, via the radar application programming interface, a response to the application indicating occurrence of the gesture.

18. The apparatus of claim 16, wherein the radar system is configured to:

accept, via a third layer of the multiple layers of the radar application programming interface, a third request from the application of the apparatus, the third request comprising an implementation chain specifying a sequence of modules associated with digital signal processing or data processing; and modify a software configuration of the radar system based on the implementation chain.

19. The apparatus of claim 16, wherein:

each state within the sequence of states comprises at least one criterion associated with the gesture;

the sequence of states comprises a first state;

the first state comprises a first criterion; and the first criterion comprises at least one of the following:

an entrance criterion for entering the first state; or an exit criterion for exiting the first state.

20. The apparatus of claim 16, wherein:

the object performs other motions in addition to the gesture; and the radar system is configured to determine that the other motions are not associated with the gesture based on the pattern recognition sequence.

* * * * *